(12) United States Patent
Suzuki et al.

(10) Patent No.: US 6,359,415 B1
(45) Date of Patent: Mar. 19, 2002

(54) APPARATUS FOR CONTROLLING SYNCHRONOUS MOTOR

(75) Inventors: Kentaro Suzuki; Hiroshi Uchino, both of Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/582,621

(22) PCT Filed: Oct. 30, 1998

(86) PCT No.: PCT/JP98/04938

§ 371 Date: Sep. 20, 2000

§ 102(e) Date: Sep. 20, 2000

(87) PCT Pub. No.: WO00/27024

PCT Pub. Date: May 11, 2000

(51) Int. Cl.[7] .................................................. H02P 1/24
(52) U.S. Cl. ........................ 318/727; 318/721; 318/700; 318/701
(58) Field of Search ................................. 318/701–727, 318/800–832, 799

(56) References Cited

U.S. PATENT DOCUMENTS

| | | | |
|---|---|---|---|
| 5,309,075 A | * | 5/1994 | Yokoe et al. |
| 5,796,228 A | * | 8/1998 | Kojima et al. |
| 5,854,547 A | * | 12/1998 | Nakazawa |
| 5,936,372 A | * | 8/1999 | Nashiki et al. |
| 6,081,093 A | * | 6/2000 | Oguro et al. |
| 6,208,108 B1 | * | 3/2001 | Nashiki et al. |
| 2001/0002784 A1 | * | 6/2001 | Masaki et al. |

FOREIGN PATENT DOCUMENTS

| | | | |
|---|---|---|---|
| CH | 443 565 A | | 2/1968 |
| DE | 25 11 600 A | | 9/1976 |
| DE | 27 34 059 A | | 2/1979 |
| DE | 38 20 693 A | | 12/1989 |
| FR | 1 437 366 A | | 7/1966 |
| JP | 9-182499 | * | 7/1997 |
| JP | 9-327200 | * | 12/1997 |
| WO | WO-00/74228 A1 | * | 7/2000 |

OTHER PUBLICATIONS

G. Prosperio et al: "Neuere essbare O/W–Emulgator–Mischungen" Riechstoffe Aromen Kosmetica (RAK)., vol. 28, No. 1, 1978, pp. 8–12, XP002112591 Fachverlag V. Frankenstein Eschershausen., DE p. 10, right hand column—p. 11, left–hand column.

* cited by examiner

*Primary Examiner*—Paul Ip
(74) *Attorney, Agent, or Firm*—Oblon, Spivak, McClelland, Maier & Neustadt, P.C.

(57) ABSTRACT

A synchronous motor controller comprises speed control means for calculating an active current reference value on a basis of a deviation of a speed sensed value from a speed reference value of the synchronous motor, three-phase PQ conversion means for calculating an active current value and reactive current value on a basis of an armature current of the synchronous motor and a voltage phase reference value active current control means for calculating a voltage phase compensating value on a basis of a deviation of the active current value from the active current reference value, voltage phase computing means for calculating the voltage phase reference value and polar-coordinate three-phase conversion means for calculating a three-phase voltage reference value on a basis of the voltage phase reference value and a voltage amplitude reference value.

28 Claims, 8 Drawing Sheets

APPARATUS FOR CONTROLLING SYNCHRONOUS MOTOR

TECHNICAL FIELD

This invention relates to a synchronous motor controller for driving a synchronous motor at variable speed by means of a power converter, and more particularly to a synchronous motor controller capable of controlling a synchronous motor even when the maximum output voltage of a power converter is made equal to the rated voltage of the synchronous motor.

BACKGROUND ART

FIG. 1 is a functional block diagram showing the configuration, of a conventional synchronous motor controller of this type disclosed in, for example, Jpn. Pat. Appln. KIKAI Publication No. 4-127893.

In FIG. 1, a synchronous motor controller comprises a speed computing unit 1, a speed controller 2, a three-phase dq converter 3, a magnetic flux computing unit 4, a dq axis current computing unit 5, a dq axis current controller 6, a dq three-phase converter 7, and a field current computing unit 8.

The speed computing unit 1 performs differential operations on the basis of the magnetic pole position sensed value θr of a synchronous motor (not shown) and outputs the result as the speed sensed value ωr of the synchronous motor.

The speed controller 2 performs proportional integral control on the basis of the deviation of the speed sensed value or outputted by the speed computing unit 1 from the speed reference value ωr* of the synchronous motor and determines and outputs the torque current reference value $I_T^*$ of the synchronous motor according to the magnetic flux reference value φ* of the synchronous motor.

The three-phase dq converter 3 determines the d-axis current sensed value Id of the current in the direction of magnetic pole of the synchronous motor and the q-axis current sensed value Iq of the current in the direction perpendicular to the magnetic pole on the basis of the three-phase armature current sensed values Iu, Iv, and Iw of the synchronous motor and the magnetic pole position sensed value θr, and outputs the resulting values.

The magnetic flux computing unit 4 calculates not only the dq axis gap fluxes φgd and φgq using the constant of the synchronous motor on the basis of the d-axis current Id and q-axis current Iq of the synchronous motor and the field current sensed value If but also the internal phase difference angle δ on the basis of the dq axis gap magnetic fluxes φgd and φgq and outputs the results.

The dq axis current computing unit 5 calculates the dq axis current reference values Id* and Iq* using the internal phase difference value δ on the basis of the torque current reference value $I_T^*$ and outputs the results.

The dq axis current controller 6 performs proportional integral control of each of the d-axis and q-axis on the basis of the deviation of the dq axis current sensed values Id and Iq from the dq axis current reference values Id* and Iq*, respectively, and determines and outputs the dq axis voltage reference values Vd* and Vq*.

The dq three-phase converter 7 determines the three-phase voltage reference values Vu*, Vv*, and Vw* on the basis of the dq axis voltage reference values Vd* and Vq* and the magnetic pole position sensed value θr and outputs the results.

The armature power converter of the synchronous motor controls the armature voltage on the basis of the three-phase voltage reference values Vu*, Vv*, and Vw*.

The field current computing unit 8 determines the field current reference value If* according to the magnetic flux reference values φ* and outputs the result.

The field power converter of the synchronous motor controls the field current on the basis of the field current reference value If*.

In a conventional synchronous motor controller as described above, the d-axis and q-axis of the armature current of the synchronous motor are controlled independently in the amount of direct current on the dq coordinates. To increase or decrease the dq axis current, it is necessary to increase or decrease the magnitude of the dq axis voltage, which means that the amplitude is increased or decreased on the three-phase coordinates. Consequently, when the armature current must be increased to increase the torque, while the synchronous motor is being operated at the rated voltage, it is necessary to make the output voltage of the power converter higher than the rated voltage.

As a result, it is necessary to make the maximum output voltage of the power converter higher than the rated voltage of the synchronous motor. This lowers the voltage use efficiency of the power converter.

In a state where the output voltage of the power converter has reached the maximum output voltage and been saturated, the response speed of current control can reduce or become unstable.

The object of the present invention is to provide a synchronous motor controller capable of controlling a synchronous motor stably, even when the maximum output voltage of the power converter is made equal to the rated voltage of the synchronous motor.

DISCLOSURE OF INVENTION

The foregoing object is accomplished by the following apparatuses.

In an embodiment of the invention, a synchronous motor controller for driving a synchronous motor at variable speed by means of a power converter, comprises speed control means for calculating the active current reference value the power converter is to output, on the basis of the deviation of the speed sensed value of the synchronous motor from the speed reference value of the synchronous motor; three-phase PQ conversion means for calculating the active current value and reactive current value the power converter is to output, on the basis of the three-phase current sensed value, or the armature current of the synchronous motor, and the voltage phase reference value of the voltage the power converter outputs; active current control means for calculating the voltage phase compensating value of the voltage the power converter outputs, on the basis of the deviation of the active current value calculated by the three-phase PQ conversion means from the active current reference value calculated by the speed control means; voltage phase computing means for calculating the voltage phase reference value of the voltage the power converter is to output, on the basis of the voltage phase compensating value calculated by the active power control means and the magnetic pole position sensed value of the synchronous motor; and polar-coordinate three-phase conversion means for calculating the three-phase voltage reference value of the voltage the power converter is to output, on the basis of the voltage phase reference value calculated by the voltage phase computing means and the voltage amplitude reference value of the voltage the power converter outputs.

With the synchronous motor controller according to this embodiment, the active current the power converter outputs is controlled by changing the phase of the voltage, while keeping constant the amplitude of the voltage outputted from the power converter. This enables the synchronous motor to be controlled stably, even when the maximum output voltage of the power converter is made equal to the rated voltage of the synchronous motor.

In another embodiment of the invention, the synchronous motor controller further comprises reactive current control means for calculating the field current compensating value of the synchronous motor on the basis of the deviation of the reactive current value calculated by the three-phase PQ conversion means from the reactive current reference value the power converter outputs; and field current computing means for calculating the field current reference value of the synchronous motor on the basis of the field current compensating value calculated by the reactive current control means and the magnetic flux reference value of the synchronous motor.

With the synchronous motor controller according to this embodiment, the reactive current the power converter outputs can be controlled to a given value. Reducing the reactive current particularly to zero enables the power factor to be kept at one.

In another embodiment of the invention, the synchronous motor controller further comprises a high-pass filter for calculating a voltage phase oscillation compensating value on the basis of the reactive current value calculated by the three-phase PQ conversion means, and in place of the voltage phase computing means, using voltage phase computing means for calculating the voltage phase reference value of the voltage the power converter is to output, on the basis of the voltage phase oscillation compensating value calculated by the high-pass filter, the voltage phase compensating value calculated by the active current control means, and the magnetic pole position sensed value of the synchronous motor.

With the synchronous motor controller according to this embodiment, when the active current the power converter outputs is controlled by the change of the voltage phase, the oscillation of the active current taking place as a result of the oscillation of the voltage phase can be controlled.

In another embodiment of the invention, the synchronous motor controller uses three-phase dq conversion means for calculating the d-axis current value, or the armature current in the direction of magnetic pole of the synchronous motor, and the q-axis current value, or the armature current in the direction perpendicular to the magnetic pole, on the basis of the three-phase current sensed value, or the armature current of the synchronous motor, and the magnetic pole position sensed value of the synchronous motor, further comprises magnetic flux computing means for calculating the internal phase difference angle of the synchronous motor using the constant of the synchronous motor, on the basis of the d-axis current value and q-axis current value calculated by the three-phase dq conversion means and the field current sensed value of the synchronous motor, and using voltage phase computing means for calculating the voltage phase reference value of the voltage the power converter is to output, on the basis of the internal phase difference angle calculated by the magnetic flux computing means, the voltage phase compensating value calculated by the active current control means, and the magnetic pole position sensed value of the magnetic pole motor of the synchronous motor.

With the synchronous motor controller according to this embodiment, when the active current the power converter outputs is controlled by the change of the voltage phase, the response speed of the active current can be improved by compensating for the voltage phase reference value in a feedforward manner.

In another embodiment of the invention, the synchronous motor controller further comprises voltage phase feedforward computing means for calculating the voltage phase feedforward value of the voltage the power converter outputs, using the constant of the synchronous motor, on the basis of the active current reference value calculated by the speed control means and the voltage amplitude reference value of the voltage the power converter outputs, and in place of the voltage phase computing means, using voltage phase computing means for calculating the voltage phase reference value of the voltage the power converter is to output, on the basis of the voltage phase feedforward value calculated by the voltage phase feedforward computing means, the voltage phase compensating value calculated by the active current control means, and the magnetic pole position sensed value of the synchronous motor.

With the synchronous motor controller according to this invention, when the active current the power converter outputs is controlled by the change of the voltage phase, the response speed of the active current can be improved by compensating for the voltage phase reference value in a feedforward manner.

In another embodiment of the invention, the synchronous motor controller further comprises amplifying means for calculating the voltage amplitude compensating value of the voltage the power converter outputs, on the basis of the deviation of the active current value calculated by the three-phase PQ conversion means from the active current reference value calculated by the speed control means, and add means for adding the voltage amplitude compensating value calculated by the amplifying means to the voltage amplitude reference value of the voltage the power converter outputs to correct the voltage amplitude reference value of the voltage the power converter outputs, and outputting the corrected value, and in place of the polar-coordinate three-phase conversion means, using polar-coordinate three-phase conversion means for calculating the three-phase voltage reference value of the voltage the power converter is to output, on the basis of the corrected voltage amplitude reference value outputted from the add means and the voltage phase reference value calculated by the voltage phase computing means.

With the synchronous motor controller according to this embodiment, when the active current the power converter outputs is controlled by the change of the voltage phase, the response speed of the active current can be improved by compensating for the voltage amplitude.

In another embodiment of the invention, the synchronous motor controller further comprises three-phase dq conversion means for calculating the d-axis current value, or the armature current in the direction of magnetic pole of the synchronous motor, and the q-axis current value, or the armature current in the direction perpendicular to the magnetic pole, on the basis of the three-phase current sensed value, or the armature current of the synchronous motor, and the magnetic pole position sensed value of the synchronous motor, magnetic flux computing means for calculating the internal phase difference angle of the synchronous motor using the constant of the synchronous motor, on the basis of the d-axis current value and q-axis current value calculated by the three-phase dq conversion means and the field current sensed value of the synchronous motor, voltage phase feedforward computing means for calculating the voltage phase feedforward value of the voltage the power converter outputs, using the constant of the synchronous motor, on the basis of the active current reference value calculated by the speed control means and the voltage amplitude reference value the power converter outputs, and field current feedforward computing means for calculating the field current feedforward value of the synchronous motor, using the constant of the synchronous motor, on the basis of the internal phase difference angle calculated by the magnetic flux computing means, the voltage phase feedforward value calculated by the voltage phase feedforward computing means, the active current reference value calculated by the speed control means, and the voltage amplitude reference value of the voltage the power converter outputs, and in place of the field current computing means, using field current computing means for calculating the field current reference value of the synchronous motor, on the basis of the field current feedforward value calculated by the field current feedforward computing means, the field current compensating value calculated by the reactive current control means, and the magnetic flux reference value of the synchronous motor.

With the synchronous motor controller according to this embodiment, when the reactive current the power converter outputs is controlled by adjusting the field current, the response speed of the reactive current can be improved by compensating for the field current reference value in a feedforward manner.

In another embodiment of the invention, a synchronous motor controller for driving a synchronous motor at variable speed by means of a power converter, comprises speed control means for calculating the torque current reference value of the synchronous motor on the basis of the deviation of the speed sensed value of the synchronous motor from the speed reference value of the synchronous motor; three-phase dq conversion means for calculating the d-axis current value, or the armature current in the direction of magnetic pole of the synchronous motor, and the q-axis current value, or the armature current in the direction perpendicular to the magnetic pole, on the basis of the three-phase current sensed value, or the armature current of the synchronous motor, and the magnetic pole position sensed value of the synchronous motor; magnetic flux computing means for calculating the internal phase difference angle of the synchronous motor using the constant of the synchronous motor, on the basis of the d-axis current value and q-axis current value calculated by the three-phase dq conversion means and the field current sensed value of the synchronous motor; three-phase MT conversion means for calculating the magnetic flux current value and torque current value of the synchronous motor, on the basis of the internal phase difference angle calculated by the magnetic flux computing means, the magnetic pole position sensed value of the synchronous motor, and the three-phase current sensed value, or the armature current of the synchronous motor; torque current control means for calculating the voltage phase compensating value of the voltage the power converter outputs, on the basis of the deviation of the torque current value calculated by the three-phase MT conversion means from the torque current reference value calculated by the speed control means; voltage phase computing means for calculating the voltage phase reference value of the voltage the power converter is to output, on the basis of the voltage phase compensating value calculated by the torque current control means and the magnetic pole position sensed value of the synchronous motor; and polar-coordinate three-phase conversion means for calculating the three-phase voltage reference value of the voltage the power converter is to output, on the basis of the voltage phase reference value calculated by the voltage phase computing means and the voltage amplitude reference value of the voltage the power converter outputs.

With the synchronous motor controller according to this embodiment, the torque current of the synchronous motor is controlled by changing the phase of the voltage, while keeping constant the amplitude of the voltage the power converter outputs. Thus, even when the maximum output voltage of the power converter is made equal to the rated voltage of the synchronous motor, the synchronous motor can be controlled stably.

In another embodiment of the invention, the synchronous motor controller further comprises magnetic flux current control means for calculating the field current compensating value of the synchronous motor on the basis of the deviation of the magnetic flux current value calculated by the three-phase MT conversion means from the magnetic flux current reference value of the synchronous motor, and in place of the field current computing means, using field current computing means for calculating the field current reference value of the synchronous motor, on the basis of the field current compensating value calculated by the magnetic flux current control means and the magnetic flux reference value of the synchronous motor.

With the synchronous motor controller according to this embodiment, the magnetic flux current of the synchronous motor can be controlled to a given value. Reducing the magnetic flux particularly to zero enables the power factor of the synchronous motor to be kept at one.

In another embodiment of the invention, the synchronous motor controller further comprises a high-pass filter for calculating a voltage phase oscillation compensating value on the basis of the magnetic flux current value calculated by the three-phase MT conversion means, and in place of the voltage phase computing means, using voltage phase computing means for calculating the voltage phase reference value of the voltage the power converter is to output, on the basis of the voltage phase oscillation compensating value calculated by the high-pass filter, the voltage phase compensating value calculated by the torque current control means, and the magnetic pole position sensed value of the synchronous motor.

With the synchronous motor controller according to this embodiment, when the torque current of the synchronous motor is controlled by the change of the voltage phase the power converter outputs, the oscillation of the torque current taking place as a result of the oscillation of the voltage phase can be suppressed.

In another embodiment of the invention, the synchronous motor controller, in place of the voltage phase computing means, using voltage phase computing means for calculating the voltage phase reference value of the voltage the power converter is to output, on the basis of the internal phase difference angle calculated by the magnetic flux computing means, the voltage phase compensating value calculated by the torque current control means, and the magnetic pole position sensed value of the synchronous motor.

With the synchronous motor controller according to this embodiment, when the torque current of the synchronous motor is controlled by the change of the voltage phase the power converter outputs, the response speed of the torque current can be improved by compensating for the voltage phase reference value in a feedforward manner.

In another embodiment of the invention, the synchronous motor controller further comprises voltage phase feedforward computing means for calculating the voltage phase feedforward value of the voltage the power converter outputs, using the constant of the synchronous motor, on the basis of the torque current reference value calculated by the speed control means and the voltage amplitude reference value of the voltage the power converter outputs, and in place of the voltage phase computing means, using voltage phase computing means for calculating the voltage phase reference value of the voltage the power converter is to output, on the basis of the voltage phase feedforward value calculated by the voltage phase feedforward computing means, the voltage phase compensating value calculated by the torque current control means, and the magnetic pole position sensed value of the synchronous motor.

With the synchronous motor controller according to this embodiment, when the torque current of the synchronous motor is controlled by the change of the voltage phase the power converter outputs, the response speed of the torque current can be improved by compensating for the voltage phase reference value in a feedforward manner.

In another embodiment of the invention, the synchronous motor controller further comprises amplifying means for calculating the voltage amplitude compensating value of the voltage the power converter is to output, on the basis of the deviation of the torque current value calculated by the three-phase MT conversion means from the torque current reference value calculated by the speed control means and add means for adding the voltage amplitude compensating value calculated by the amplifying means to the voltage amplitude reference value of the voltage the power converter outputs to correct the voltage amplitude reference value of the voltage the power converter is to output, and outputting the corrected value, and in place of the polar-coordinate three-phase conversion means, using polar-coordinate three-phase conversion means for calculating the three-phase voltage reference value of the voltage the power converter is to output, on the basis of the corrected voltage amplitude reference value outputted from the add means and the voltage phase reference value calculated by the voltage phase computing means.

With the synchronous motor controller according to this embodiment, when the torque current of the synchronous motor is controlled by the change of the voltage phase the power converter outputs, the response speed of the torque current can be improved by compensating for the voltage amplitude.

In another embodiment of the invention, the synchronous motor controller further comprises field current feedforward computing means for calculating the field current feedforward value of the synchronous motor using the constant of the synchronous motor, on the basis of the internal phase difference angle calculated by the magnetic flux computing means, the torque current reference value calculated by the speed control means, and the voltage amplitude reference value of the voltage the power converter outputs, and in place of the field current computing means, using field current computing means for calculating the field current reference value of the synchronous motor, on the basis of the field current feedforward value calculated by the field current feedforward computing means, the field current compensating value calculated by the magnetic flux current control means, and the magnetic flux reference value of the synchronous motor.

With the synchronous motor controller according to this embodiment, when the magnetic flux current of the synchronous motor is controlled by adjusting the field current, the response speed of the magnetic flux current can be improved by compensating for the field current reference value in a feedforward manner.

BEST MODE FOR CARRYING OUT THE INVENTION (First Embodiment)

Figure 2:
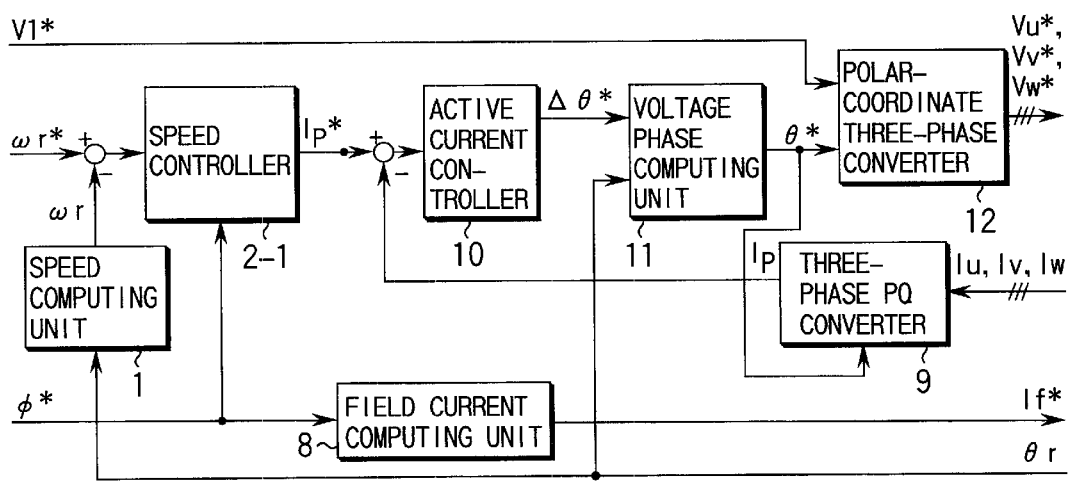
FIG. 2 is a functional block diagram of a first embodiment of a synchronous motor controller according to the present invention.

FIG. 2 is a functional block diagram showing an example of the configuration of a synchronous motor controller according to a first embodiment of the present invention.

Figure 1:
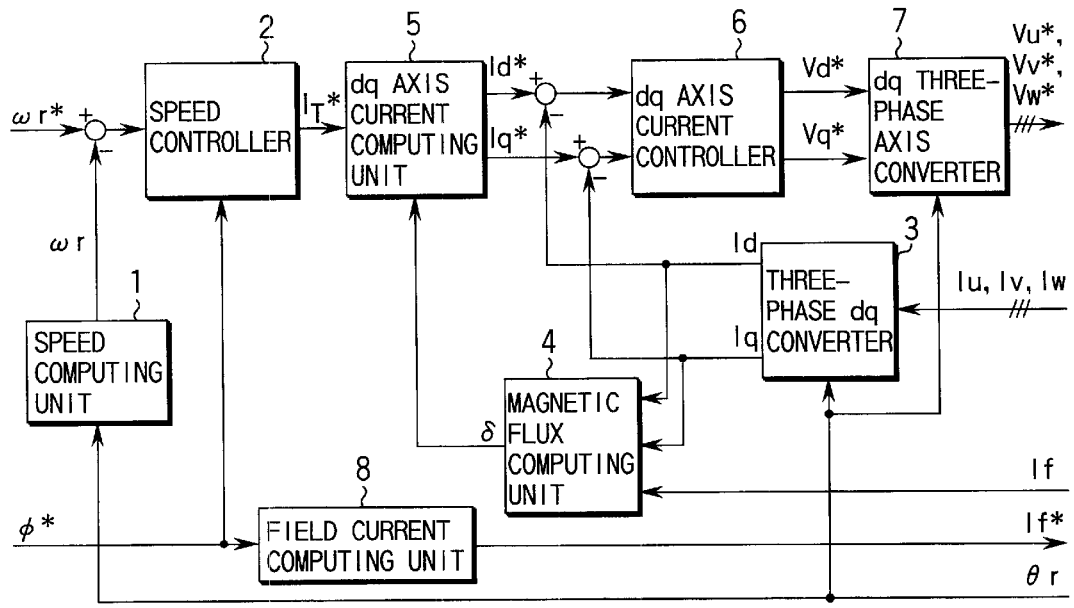
FIG. 1 is a functional block diagram showing an example of the configuration of a conventional synchronous motor controller.

The same parts as those in FIG. 1 are indicated by the same reference symbols and an explanation of them will be omitted. Only the parts differing from those in FIG. 1 will be explained.

As shown in FIG. 2, the synchronous motor controller according to the first embodiment is such that the speed controller 2, three-phase dq converter 3, magnetic flux computing unit 4, dq axis current computing unit 5, dq axis current controller 6, and dq three-phase converter are eliminated from the configuration of FIG. 2 and, instead of these, a speed controller 2-1, a three-phase PQ converter 9, an active current controller 10, a voltage phase computing unit 11, and a polar-coordinate three-phase converter 12 are included.

On the basis of the deviation of the speed sensed value of the synchronous motor from the speed reference value of the synchronous motor, the speed controller 2-1 computes the active current reference value the power converter is to output.

On the basis of the three-phase current sensed value, or the armature current of the synchronous motor, and the voltage phase reference value of the voltage outputted from the power converter, the three-phase PQ converter 9 calculates the active current value and reactive current value the power converter is to output.

On the basis of the deviation of the active current value calculated by the three-phase PQ converter 9 from the active current reference value calculated by the speed controller 2-1, the active current controller 10 computes the voltage phase compensating value of the voltage the power converter outputs.

On the basis of the voltage phase compensating value computed by the active power controller 10 and the magnetic pole position sensed value of the synchronous motor, the voltage phase computing unit 11 calculates the voltage phase reference value of the voltage the power converter outputs.

On the basis of the voltage phase reference value computed by the voltage phase computing unit 11 and the voltage amplitude reference value of the voltage outputted from the power converter, the polar-coordinate three-phase converter 12 computes the three-phase voltage reference value of the voltage the power converter outputs.

Next, the operation of the synchronous motor controller according to the first embodiment constructed as described above will be explained.

In FIG. 2, the speed controller 2-1 performs proportional integral control on the basis of the deviation of the speed sensed value $\omega r$ from the speed reference value $\omega r^*$ of the synchronous motor and determines and outputs the active current reference value $I_P^*$ the power converter is to output.

At this time, the magnitude of the active current reference value $I_P^*$ is made inversely proportional to the magnetic flux reference value $\phi^*$ of the synchronous motor, which compensates for a decrease in the torque in the somewhat weak field area.

On the basis of the three-phase armature current sensed values Iu, Iv, and Iw of the synchronous motor and the phase reference value $\theta^*$ of the voltage outputted from the power converter, the three-phase PQ converter 9 determines the active current value $I_P$ and reactive current value $I_Q$ the power converter is to output and outputs the results.

The active current controller 10 performs proportional integral control on the basis of the deviation of the active current value $I_P$ from the, active current reference value $I_P^*$ and determines and outputs the voltage-phase compensating value $\Delta\theta^*$ of the voltage the power converter outputs.

On the basis of the voltage-phase compensating value $\Delta\theta^*$ and magnetic-pole position sensed value $\theta r$ of the synchronous motor, the voltage phase computing unit 11 calculates the voltage phase reference value $\theta^*$ of the voltage the power converter outputs, using the following equation and outputs the result:

$$\theta^* = \theta r + \Delta\theta^*$$

On the basis of the voltage phase reference value $\theta^*$ and the voltage amplitude reference value $V_1^*$ of the output the power converter outputs, the polar-coordinate three-phase converter 12 computes the three-phase voltage reference values Vu*, Vv*, and Vw* the power converter is to output, using the following equations:

$$Vu^* = V_1^* \cos\theta^*$$

$$Vv^* = V_1^* \cos(\theta^* - 120°)$$

$$Vw^* = V_1^* \cos(\theta^* - 240°)$$

The power converter controls the armature voltage of the synchronous motor on the basis of the three-phase voltage reference values Vu*, Vv*, and Vw* determined as described above.

Next, the operation of the synchronous motor controller according to the first embodiment will be described concretely by reference to FIG. 3.

FIG. 2 is a voltage-current vector diagram at a certain moment, where $\underline{V_1}$ is the power converter output voltage vector, $\underline{I_1}$ is the armature current vector of the synchronous motor, $\underline{V_g}$ is the gap voltage vector of the synchronous motor, and $\underline{V_L}$ is the voltage vector applied to the armature leakage inductance $L_1$ of the synchronous motor.

Each voltage vector satisfies the following equation:

$$\underline{V_L} = \underline{V_1} - \underline{V_g}$$

The armature current vector $\underline{I_1}$ is expressed by the following equation:

$$\underline{I_1} = \underline{V_L}/j\omega L_1$$

where $\omega$ is the electrical angular frequency.

When the phase of the output voltage vector of the power converter is increased by $\Delta\theta$ from $\underline{V_1}$ to $\underline{V_1'}$, with its magnitude remaining unchanged, the voltage vector applied to the armature leakage inductance L is expressed by the following equation:

$$\underline{V_L'} = \underline{V_1'} - \underline{V_g}$$

In addition, the armature current vector is expressed by the following equation:

$$\underline{I_1'} = \underline{V_L'}/j\omega L_1$$

For the reasons stated above, increasing the phase causes the armature current to increase, which results in an increase in the active current component included in the armature current. Conversely, decreasing the phase causes the active current component to decrease.

As described above, with the synchronous motor controller of the first embodiment, because only the phase is allowed to change, with the amplitude of the armature voltage being fixed to a constant value, the armature current can be controlled, which enables the synchronous motor to be controlled stably, even when the maximum output voltage of the power converter is made equal to the rated voltage of the synchronous motor.

(Second Embodiment)

Figure 4:
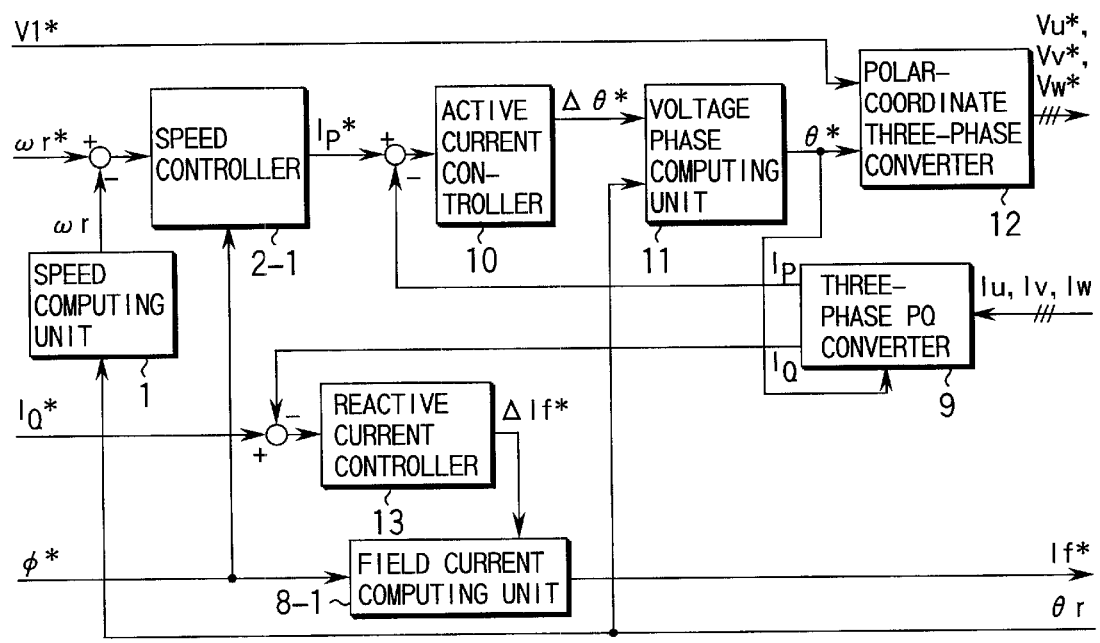
FIG. 4 is a functional block diagram of a second embodiment of the synchronous motor controller according to the present invention.

FIG. 4 is a functional block diagram showing an example of the configuration of a synchronous motor controller according to a second embodiment of the present invention. The same parts as those in FIG. 2 are indicated by the same reference symbols and an explanation of them will be omitted. Only the parts differing from those in FIG. 2 will be explained.

As shown in FIG. 4, the synchronous motor controller according to the second embodiment is such that a reactive current controller 13 is added to the configuration of FIG. 2 and a field current computing unit 8-1 is used in place of the field current computing unit 8.

The reactive current controller 13 computes the field current compensating value of the synchronous motor on the basis of the deviation of the reactive current value computed by the three-phase PQ converter 9 from the reactive current reference value the power converter outputs.

The field current computing unit 8-1 calculates the field current reference value of the synchronous motor on the basis of the field current compensating value calculated by the reactive current controller 13 and the magnetic flux reference value of the synchronous motor.

Next, the operation of the synchronous motor controller according to the second embodiment constructed as described above will be explained.

An explanation of the operation of the same parts as those in FIG. 2 will be omitted. The operation of only the parts differing from those in FIG. 2 will be described below.

In FIG. 4, the reactive current controller 13 performs proportional integral control on the basis of the deviation of the reactive current value $I_Q$ from the reactive current reference value $I_Q^*$ the power converter outputs, and determines and outputs the field current compensating value $\Delta If^*$ of the synchronous motor.

On the basis of the field current compensating value $\Delta If^*$ and magnetic flux reference value $\phi^*$, the field current unit 8-1 calculates the field current reference value $If^*$ of the synchronous motor, using the following equation and outputs the result:

$$If^* = \phi^*/Md - \Delta If^*$$

where Md is the synchronous motor d-axis mutual inductance.

The power converter controls the field current of the synchronous motor on the basis of the field current reference value $If^*$ determined as described above.

Next, the operation of the synchronous motor controller according to the second embodiment will be explained more concretely by reference to FIG. 5.

Figures 3, 5:
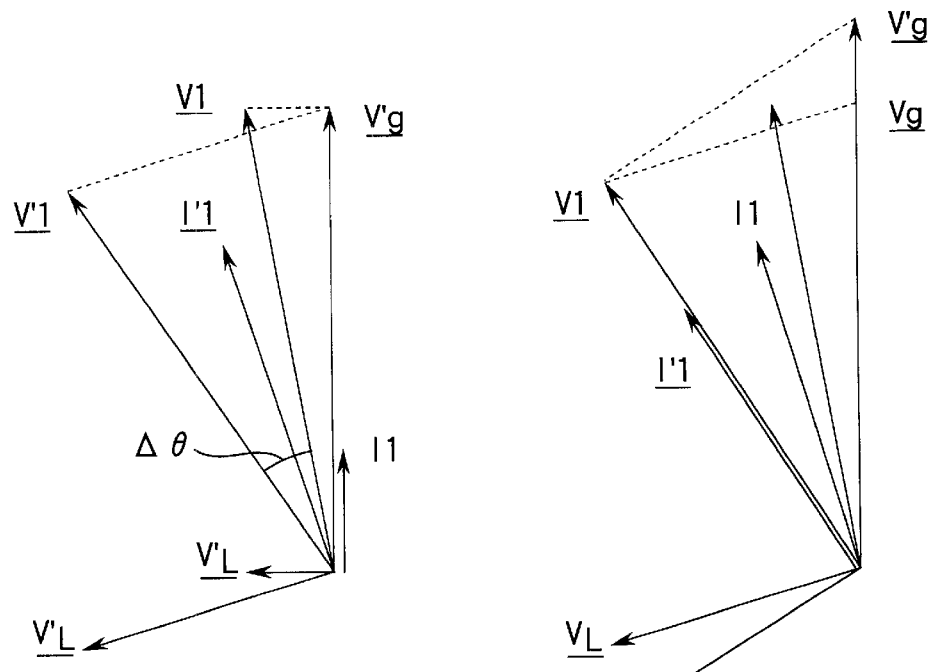
FIG. 3 is a voltage-current vector diagram to help explain the operation of the synchronous motor controller according to the first embodiment.
FIG. 5 is a voltage-current vector diagram to help explain the operation of the synchronous motor controller according to the second embodiment.

FIG. 5 is a voltage-current vector diagram at a certain moment as in FIG. 3.

Consider a case where the reactive reference value is zero. When the reactive current controller has been caused to adjust the field current of the synchronous motor and then the gap voltage vector of the synchronous motor has been changed from $\underline{V}_g$ to $\underline{V}'_g$, the voltage vector applied to the armature leakage conductance L changes from $\underline{V}_L$ to $\underline{V}'_L$.

At this time, if the output vector $\underline{V}_1$ of the power converter is at right angles to the voltage vector $\underline{V}'_L$ applied to the armature leakage inductance L, the output vector $\underline{V}_1$ of the power converter has the same phase as that of the armature current vector $\underline{I}_1$, with the result that the reactive current outputted from the power converter becomes zero.

Similarly, when the reactive current reference value is other than zero, the reactive current controller 13 enables the reactive current outputted from the power converter to follow the reference value.

As described above, the synchronous motor controller of the second embodiment not only produces the same effect as that of the first embodiment but also enables the reactive current outputted from the power converter to be controlled to a given value. When the reactive current is made particularly to zero, this makes it possible to keep the power factor of the power converter at 1.

(Third Embodiment)

Figure 6:
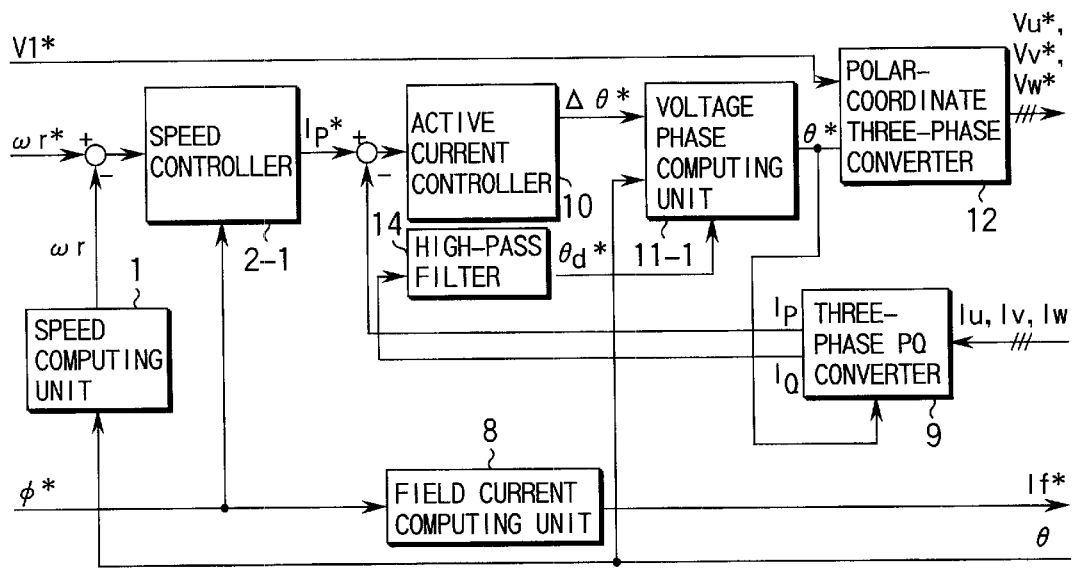
FIG. 6 is a functional block diagram of a third embodiment of the synchronous motor controller according to the present invention.

FIG. 6 is a functional block diagram showing an example of the configuration of a synchronous motor controller according to a third embodiment of the present invention. The same parts as those in FIG. 2 are indicated by the same reference symbols and an explanation of them will be omitted. Only the parts differing from those in FIG. 2 will be explained.

As shown in FIG. 6, the synchronous motor controller according to the third embodiment is such that a high-pass filter 14 is added to the configuration of FIG. 2 and a voltage phase computing unit 11-1 is used in place of the voltage phase computing unit 11.

The high-pass filter 14 calculates the voltage phase oscillation compensating value on the basis of the reactive current value calculated by the three-phase PQ converter 9.

On the basis of the voltage phase oscillation compensating value computed by the high-pass filter 14, the voltage phase compensating value computed by the active current controller 10, and the magnetic pole position sensed value of the synchronous motor, the voltage phase computing unit 11-1 computes the voltage phase reference value of the voltage the power converter outputs.

Next, the operation of the synchronous motor controller according to the third embodiment constructed as described above will be explained.

Explanation of the operation of the same parts as those in FIG. 2 will be omitted. The operation of only the parts differing from those in FIG. 2 will be explained.

In FIG. 6, the high-pass filter 14 senses the oscillating component included in the reactive current by removing the direct-current component from the reactive current value $I_Q$ the power converter outputs, determines the voltage phase oscillation compensating value $\theta d^*$ of the voltage the power converter outputs by multiplying the sensed oscillating component by a suitable coefficient, and outputs the determined compensating value.

On the basis of the voltage phase oscillation compensating value $\theta d^*$, the voltage phase compensating value $\Delta\theta^*$, and the magnetic pole position sensed value $\theta r$ of the synchronous motor, the voltage phase computing unit 11-1 calculates the voltage phase reference value $\theta^*$ of the voltage the power converter outputs, using the following equation, and outputs the result:

$$\theta^* = \theta r + \Delta\theta^* + \theta d^*$$

As described above, the synchronous motor controller of the third embodiment not only produces the same effect as that of the first embodiment but also suppresses the oscillation of the active current taking place as a result of the oscillation of the voltage phase, when the active current the power converter outputs is controlled by the change of the voltage phase.

(Fourth Embodiment)

Figure 7:
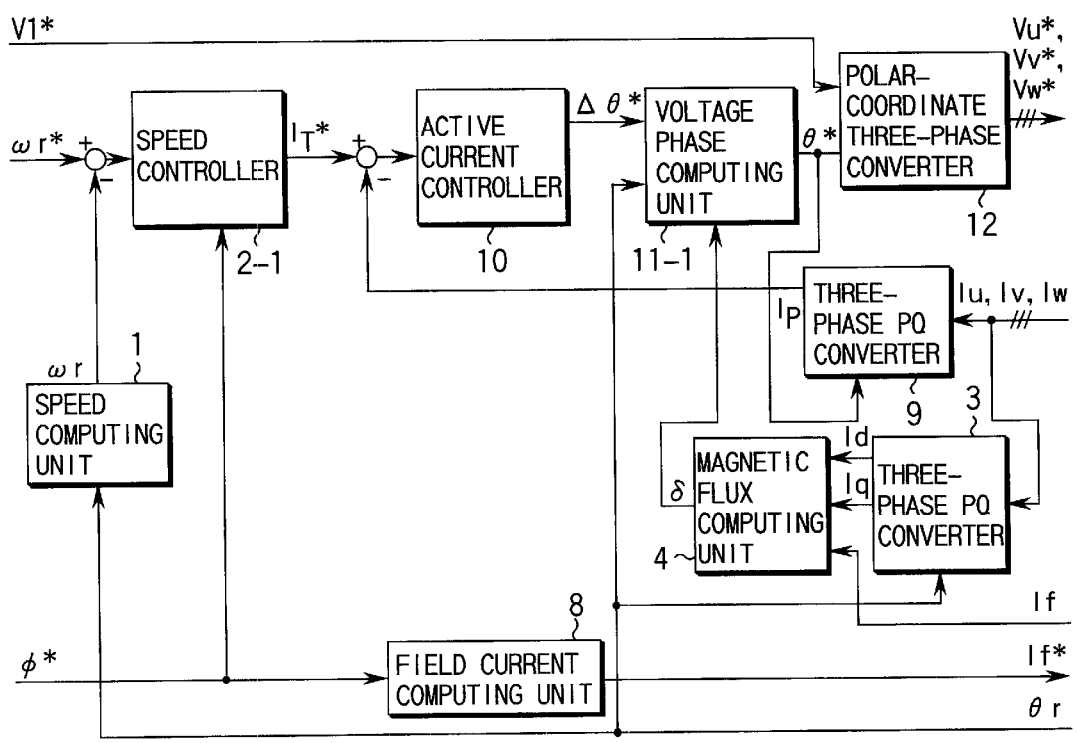
FIG. 7 is a functional block diagram of a fourth embodiment of the synchronous motor controller according to the present invention.

FIG. 7 is a functional block diagram showing an example of the configuration of a synchronous motor controller according to a fourth embodiment of the present invention. The same parts as those in FIG. 2 are indicated by the same reference symbols and an explanation of them will be omitted. Only the parts differing from those in FIG. 2 will be explained.

As shown in FIG. 7, the synchronous motor controller according to the fourth embodiment is such that a magnetic flux computing unit 4 is added to the configuration of FIG. 2 and a three-phase dq converter 3 and a voltage phase computing unit 11-2 are used in place of the three-phase dq converter 3 and voltage phase computing unit 11.

The three-phase dq converter 3 computes the d-axis current value, or the armature current in the direction of magnetic pole of the synchronous motor, and the q-axis current value, or the armature current in the direction perpendicular to the magnetic pole, on the basis of the three-phase current sensed value, or the armature current of the synchronous motor, and the magnetic pole position sensed value of the synchronous motor.

On the basis of the d-axis current value and q-axis current value computed by the three-phase dq converter 3 and the field current sensed value of the synchronous motor, the magnetic flux computing unit 4 calculates the internal phase difference angle of the synchronous motor using the constant of the synchronous motor.

The voltage phase computing unit 11-2 calculates the voltage phase reference value of the voltage outputted by the power converter, on the basis of the internal phase difference angle calculated by the magnetic flux computing unit 4, the voltage phase compensating value computed by the active current controller 10, and the magnetic position sensed value of the magnetic motor of the synchronous motor.

Next, the operation of the synchronous motor controller according to the fourth embodiment constructed as described above will be explained.

Explanation of the operation of the same parts as those in FIG. 2 will be omitted. The operation of only the parts differing from those in FIG. 2 will be explained.

In FIG. 7, the three-phase dq converter 3 determines the d-axis current value Id, or the armature current in the direction of magnetic pole of the synchronous motor, and the q-axis current value Iq, or the armature current in the direction perpendicular to the magnetic pole, on the basis of the three-phase current sensed values Iu, Iv, and Iw, or the armature currents of the synchronous motor, and the magnetic pole position sensed value θr of the synchronous motor. Then, the three-phase dq converter 3 outputs the results.

On the basis of the dq axis current values Id and Iq of the synchronous motor and the field current sensed value If, the magnetic flux computing unit 4 calculates the dq axis gap magnetic fluxes φgd and φgq of the synchronous motor and internal phase difference angle δ, using the following equations, and outputs the results:

$$\phi gd = Md(Id + If)$$

$$\phi gq = Mq \cdot Iq$$

$$\delta = \tan^{-1}(\phi gq/\phi gd)$$

where Md and Mq are the dq axis mutual inductances of the synchronous motor.

The gap magnetic flux may be calculated, taking the damper current of the synchronous motor into account.

On the basis of the internal phase difference angle δ, the voltage phase compensating value Δθ*, and the magnetic pole position sensed value θr of the synchronous motor, the voltage phase computing unit 11-2 calculates the voltage phase reference value θ* of the voltage the power converter outputs, using the following equation, and outputs the result:

$$\theta^* = \theta r + \Delta\theta^* + \delta$$

As described above, the synchronous motor controller of the fourth embodiment not only produces the same effect as that of the first embodiment but also improves the response speed of active current control, because the voltage phase reference value θ* is compensated for in a feedforward manner, when the active current the power converter outputs is controlled by the change of the voltage phase.

(Fifth Embodiment)

Figure 8:
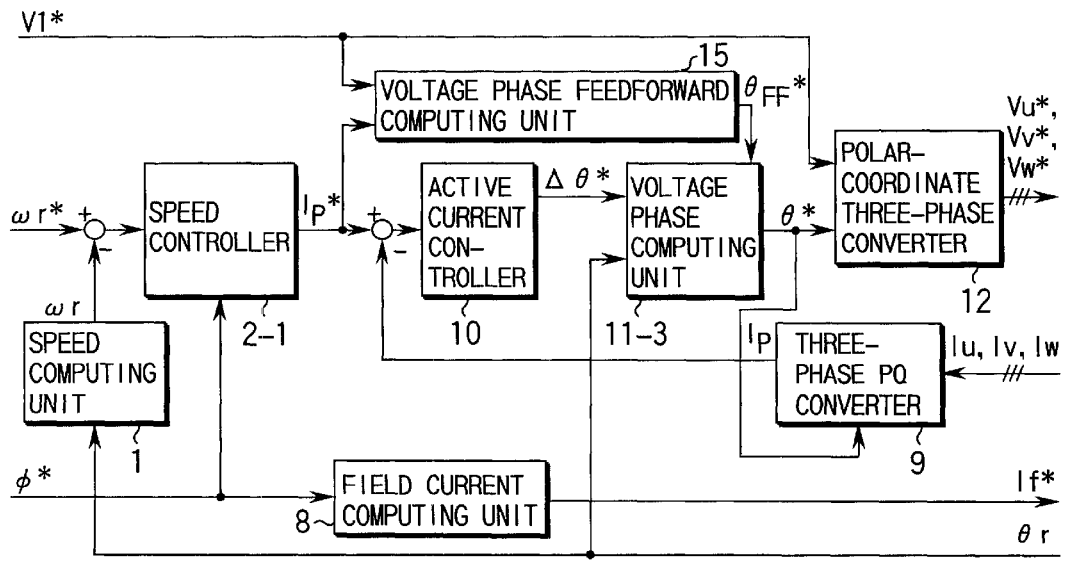
FIG. 8 is a functional block diagram of a fifth embodiment of the synchronous motor controller according to the present invention.

FIG. 8 is a functional block diagram showing an example of the configuration of a synchronous motor controller according to a fifth embodiment of the present invention. The same parts as those in FIG. 2 are indicated by the same reference symbols and an explanation of them will be omitted. Only the parts differing from those in FIG. 2 will be explained.

As shown in FIG. 8, the synchronous motor controller according to the fifth embodiment is such that a voltage phase feedforward computing unit 15 is added to the configuration of FIG. 2 and a voltage phase computing unit 11-3 is used in place of the voltage phase computing unit 11.

On the basis of the active current reference value computed by the speed controller 2-1 and the voltage amplitude reference value of the voltage outputted by the power converter, the voltage phase feedforward computing unit 15 calculates the voltage phase feedforward value of the voltage the power converter outputs, using the constant of the synchronous motor.

The voltage phase computing unit 11-3 calculates the voltage phase reference value of the voltage outputted by the power converter, on the basis of the voltage phase feedforward value calculated by the voltage phase feedforward computing unit 15, the voltage phase compensating value computed by the active current controller 10, and the magnetic pole position sensed value of the synchronous motor.

Next, the operation of the synchronous motor controller according to the fifth embodiment constructed as described above will be explained.

Explanation of the operation of the same parts as those in FIG. 2 will be omitted. The operation of only the parts differing from those in FIG. 2 will be explained.

In FIG. 8, on the basis of the active current reference value $I_P^*$ and voltage amplitude reference value $V_1^*$ outputted by the power converter, the voltage phase feedforward computing unit 15 calculates the voltage phase feedforward value $\theta_{FF}^*$, using the following equation, and outputs the result:

$$\theta_{FF}^* = \tan^{-1}(X_L \cdot I_P^*/(V_1^* - Ra \cdot I_P^*))$$

where $X_L$ is the armature leakage reactance of the synchronous motor and Ra is the armature resistance of the synchronous motor.

On the basis of the voltage phase feedforward value $\theta_{FF}^*$, the voltage phase compensating value Δθ*, and the magnetic pole position sensed value θr of the synchronous motor, the voltage phase computing unit 11-3 calculates the voltage phase reference value θ* of the voltage the power converter outputs, using the following equation, and outputs the result:

$$\theta^* = \theta r + \Delta\theta^* + \theta_{FF}^*$$

As described above, the synchronous motor controller of the fifth embodiment not only produces the same effect as that of the first embodiment but also improves the response speed of active current control, because the voltage phase reference value θ* is compensated for in a feedforward manner, when the active current the power converter outputs is controlled by the change of the voltage phase.

(Sixth Embodiment)

Figure 9:
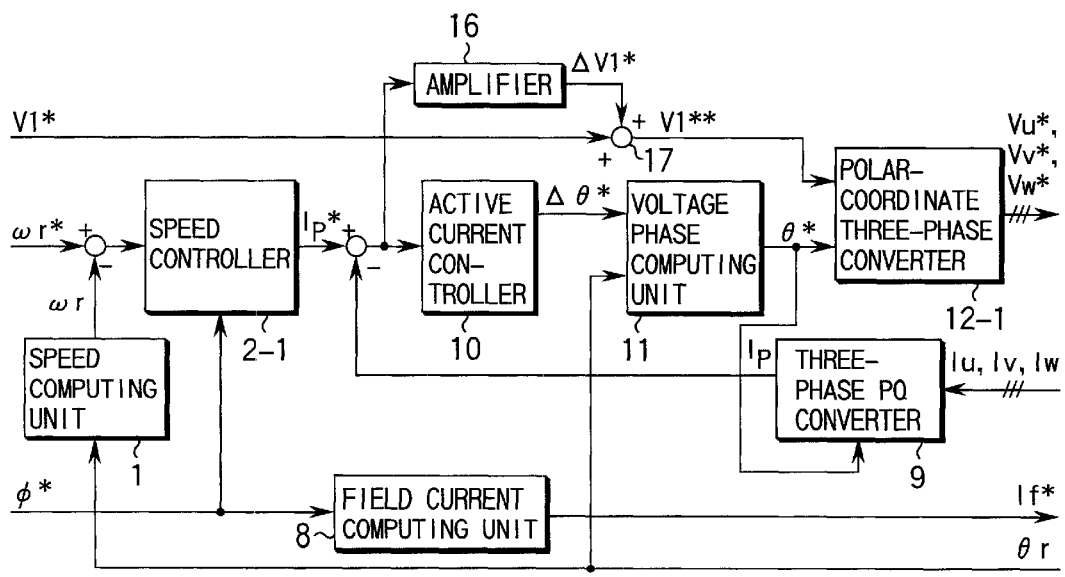
FIG. 9 is a functional block diagram of a sixth embodiment of the synchronous motor controller according to the present invention.

FIG. 9 is a functional block diagram showing an example of the configuration of a synchronous motor controller according to a sixth embodiment of the present invention. The same parts as those in FIG. 2 are indicated by the same reference symbols and an explanation of them will be omitted. Only the parts differing from those in FIG. 2 will be explained.

As shown in FIG. 9, the synchronous motor controller according to the sixth embodiment is such that an amplifier 16 and an adder 17 are added to the configuration of FIG. 2 and a polar-coordinate three-phase converter 12-1 is used in place of the polar-coordinate three-phase converter 12.

The amplifier 16 computes the voltage amplitude compensating value of the voltage the power converter outputs, on the basis of the deviation of the active current value computed by the three-phase PQ converter 9 from the active current reference value computed by the speed controller 2-1.

The adder 17 adds the voltage amplitude compensating value computed by the amplifier 16 to the voltage amplitude reference value of the voltage the power converter outputs to correct the voltage amplitude reference value outputted from the power converter and outputs the corrected value.

Next, the operation of the synchronous motor controller according to the sixth embodiment constructed as described above will be explained.

Explanation of the operation of the same parts as those in FIG. 2 will be omitted. The operation of only the parts differing from those in FIG. 2 will be explained.

In FIG. 9, the amplifier 16 amplifies the deviation of the active current value $I_P$ from the active current reference value $I_P^*$ outputted by the power converter using a suitable coefficient, thereby determining the voltage oscillation compensating value $\Delta V_1^*$ the power converter outputs, using the following equation:

$$\Delta V_1^* = K(I_P^* - I_P)$$

where K is the coefficient of the amplifier.

The adder 17 adds the voltage amplitude compensating value $\Delta V_1^*$ to the voltage amplitude reference value $V_1^*$ and outputs a new voltage amplitude reference value $V_1^{**}$.

On the basis of the voltage amplitude reference value $V_1^{**}$ and voltage phase reference value θ*, the polar-coordinate three-phase converter 12-1 calculates the three-phase voltage reference values Vu*, Vv*, and Vw* of the voltage the power converter outputs, using the following equations:

$$Vu^* = V_1^{**} \cos\theta^*$$

$$Vv^* = V_1^{**} \cos(\theta^* - 120°)$$

$$Vw^* = V_1^{**} \cos(\theta^* - 240°)$$

As described above, the synchronous motor controller of the sixth embodiment not only produces the same effect as that of the first embodiment but also improves the response speed of active current control, because the voltage amplitude is compensated for, when the active current the power converter outputs is controlled by the change of the voltage phase.

(Seventh Embodiment)

Figure 10:
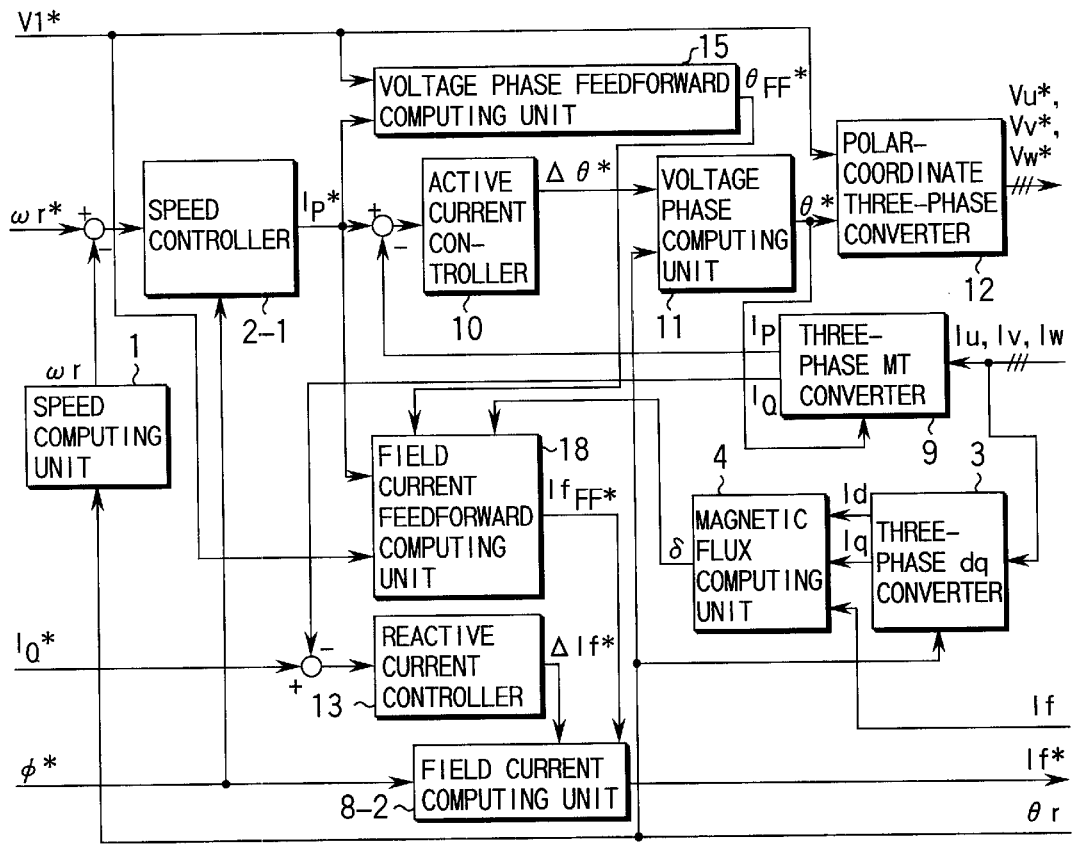
FIG. 10 is a functional block diagram of a seventh embodiment of the synchronous motor controller according to the present invention.

FIG. 10 is a functional block diagram showing an example of the configuration of a synchronous motor controller according to a seventh embodiment of the present invention. The same parts as those in FIG. 4 are indicated by the same reference symbols and an explanation of them will be omitted. Only the parts differing from those in FIG. 4 will be explained.

As shown in FIG. 10, the synchronous motor controller according to the seventh embodiment is such that a three-phase dq converter 3, a magnetic flux computing unit 4, a voltage phase feedforward computing unit 15, and a field current feedforward computing unit 18 are added to the configuration of FIG. 4 and a field current computing unit 8-2 is used in place of the field current computing unit 8.

The three-phase dq converter 3 computes the d-axis current value, or the armature current in the direction of magnetic pole of the synchronous motor, and the q-axis current value, or the armature current in the direction perpendicular to the magnetic pole, on the basis of the three-phase current sensed value, or the armature current of the synchronous motor, and the magnetic pole position sensed value of the synchronous motor.

On the basis of the d-axis current value and q-axis current value computed by the three-phase dq converter 3 and the field current sensed value of the synchronous motor, the magnetic flux computing unit 4 calculates the internal phase difference angle of the synchronous motor using the constant of the synchronous motor.

On the basis of the active current reference value computed by the speed controller 2-1 and the voltage amplitude reference value of the voltage outputted by the power converter, the voltage phase feedforward computing unit 15 calculates the voltage phase feedforward value of the voltage outputted by the power converter, using the constant of the synchronous motor.

The field current feedforward computing unit 18 calculates the field current feedforward value of the synchronous motor using the constant of the synchronous motor, on the basis of the internal phase difference angle calculated by the magnetic flux computing unit 4, the voltage phase feedforward value calculated by the voltage phase feedforward computing unit 15, the active current reference value computed by the speed controller 2-1, and the voltage amplitude reference value of the voltage the power converter outputs.

The field current computing unit 8-2 calculates the field current reference value of the synchronous motor on the basis of the field current feedforward value calculated by the field current feedforward computing unit 18, the field current compensating value computed by the reactive current controller 13, and the magnetic flux reference value of the synchronous motor.

Next, the operation of the synchronous motor controller according to the seventh embodiment constructed as described above will be explained.

Explanation of the operation of the same parts as those in FIG. 4 will be omitted. The operation of only the parts differing from those in FIG. 4 will be explained.

In FIG. 10, the three-phase dq converter 3 determines the d-axis current sensed value, or the current in the direction of magnetic pole of the synchronous motor, and the q-axis current sensed value Iq, or the current in the direction perpendicular to the magnetic pole, on the basis of the three-phase armature current sensed values Iu, Iv, and Iw of the synchronous motor and the magnetic pole position sensed value θr, and outputs the results.

The magnetic flux computing unit 4 calculates not only the dq axis gap magnetic fluxes φgd and φgq using the constant of the synchronous motor on the basis of the d-axis current Id and q-axis current Iq of the synchronous motor and the field current sensed value If, but also the internal phase difference angle δ on the basis of the dq axis gap magnetic fluxes φgd and φgq, and outputs the results.

On the basis of the active current reference value $I_P^*$ and the voltage amplitude reference value $V_1^*$ of the voltage, the voltage phase feedforward computing unit 15 calculates the voltage phase feedforward value $\theta_{FF}^*$ of the voltage power converter outputs, using the constant of the synchronous motor, and outputs the result.

On the basis of the active current reference value $I_P^*$ and voltage amplitude reference value $V_1^*$ outputted from the power converter, the voltage phase feedforward computing value $\theta_{FF}^*$, and the internal phase difference angle δ of the synchronous motor, the field current feedforward computing unit 18 calculates the field current feedforward value $If_{FF}^*$ of the synchronous motor, using the following equation, and outputs the result:

The three-phase dq converter 3 computes the d-axis current value, or the armature current in the direction of magnetic pole of the synchronous motor, and the q-axis current value, or the armature current in the direction perpendicular to the magnetic pole, on the basis of the three-phase current sensed value, or the armature current of the synchronous motor, and the magnetic pole position sensed value of the synchronous motor.

On the basis of the d-axis current value and q-axis current value computed by the three-phase dq converter 3 and the field current sensed value of the synchronous motor, the magnetic flux computing unit 4 calculates the internal phase difference angle of the synchronous motor using the constant of the synchronous motor.

The three-phase MT converter 19 computes the magnetic flux current value and torque current value of the synchronous motor on the basis of the internal phase difference angle calculated by the magnetic flux computing unit 4, the magnetic pole position sensed value of the synchronous $$If_{FF^*} = \frac{\left(\sqrt{(v_{1^*} - R_a I_{P^*})^2 + (x_L I_{P^*})^2 - (x_{aq} I_{P^*} \cos(\theta_{FF^*} + \delta))^2} + x_{ad} I_{P^*} \sin(\theta_{FF^*} + \delta)\right)}{x_{ad}}$$

where Xad and Xaq are the dq axis mutual reactances of the synchronous motor.

On the basis of the field current feedforward value $If_{FF}^*$, field current compensating value $\Delta If^*$, and magnetic flux reference value $\phi^*$, the field current computing unit 8-2 calculates the field current reference value If* of the synchronous motor, using the following equation, and outputs the result:

$$If^* = \phi^*/Md + If_{FF}^* - \Delta If^*$$

As described above, the synchronous motor controller of the seventh embodiment not only produces the same effect as that of the second embodiment but also improves the response speed of reactive current control, because the field current reference value is compensated for in a feedforward manner, when the reactive current the power converter outputs is controlled by adjusting the field current.

(Eighth Embodiment)

While the first embodiment performs control on the basis of the active current the power converter outputs, an eighth embodiment of the present invention performs control on the basis of the torque current of the synchronous motor.

Figure 11:
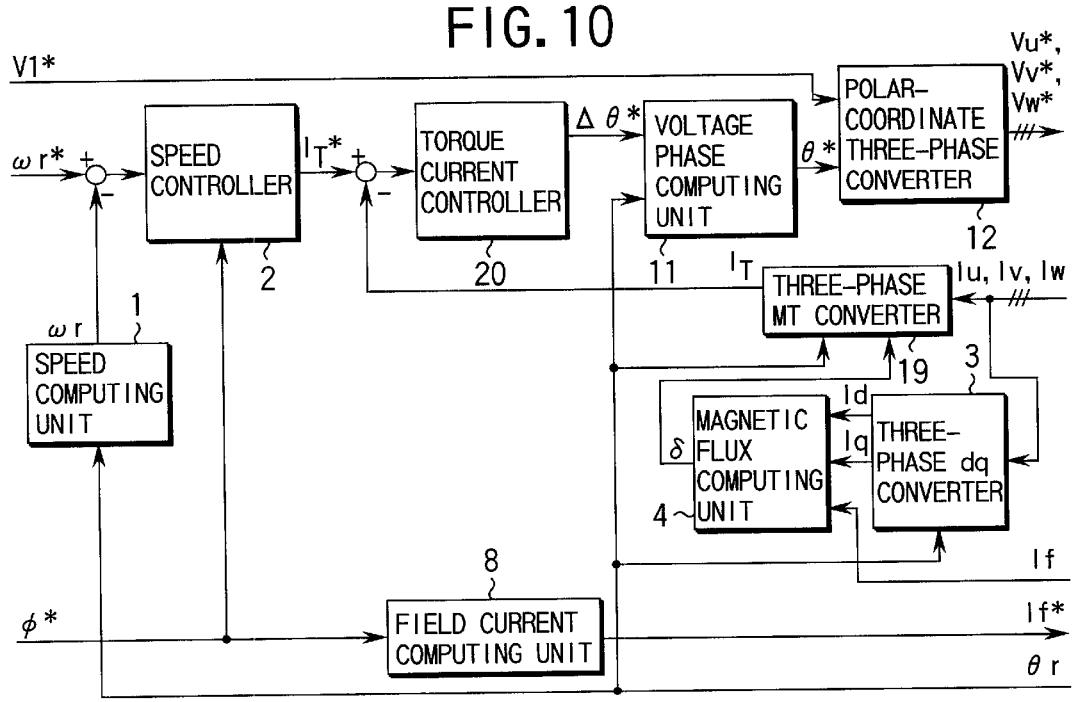
FIG. 11 is a functional block diagram of an eighth embodiment of the synchronous motor controller according to the present invention.

FIG. 11 is a functional block diagram showing an example of the configuration of a synchronous motor controller according to an eighth embodiment of the present invention. The same parts as those in FIG. 2 are indicated by the same reference symbols and an explanation of them will be omitted. Only the parts differing from those in FIG. 2 will be explained.

As shown in FIG. 11, the synchronous motor controller according to the eighth embodiment is such that the speed controller 2-1, three-phase PQ converter 9, and active current controller 10 are eliminated from the configuration of FIG. 2 and, instead of these, a speed controller 2, a three-phase dq converter 3, a magnetic flux computing unit 4, a three-phase MT converter 19, and a torque current controller 20 are used.

The speed controller 2 computes the torque current reference value of the synchronous motor on the basis of the deviation of the speed sensed value of the synchronous motor from the speed reference value of the synchronous motor.

motor, and the three-phase current sensed value, or the armature current of the synchronous motor.

On the basis of the deviation of the torque current value computed by the three-phase MT converter 19 from the torque current reference value computed by the speed controller 2, the torque current controller 20 computes the voltage phase compensating value of the voltage the power converter outputs.

Next, the operation of the synchronous motor controller according to the eighth embodiment constructed as described above will be explained.

Explanation of the operation of the same parts as those in FIG. 2 will be omitted. The operation of only the parts differing from those in FIG. 2 will be explained.

In FIG. 11, the speed controller 2 performs proportional integral control on the basis of the deviation of the speed sensed value ωr outputted by the speed computing unit 1 from the speed reference value ωr* of the synchronous motor, determines the torque current reference value $I_T^*$ of the synchronous motor according to the magnetic flux reference value $\phi^*$ of the synchronous motor, and outputs the result.

The three-phase dq converter 3 determines the d-axis current value Id, or the armature current in the direction of magnetic pole of the synchronous motor, and the q-axis current value Iq, or the armature current in the direction perpendicular to the magnetic pole, on the basis of the three-phase current sensed values Iu, Iv, and Iw, or the armature currents of the synchronous motor, and the magnetic pole position sensed value θr of the synchronous motor.

On the basis of the dq axis current values Id and Iq of the synchronous motor and the field current sensed value If, the magnetic flux computing unit 4 calculates the dq axis gap fluxes φgd and φgq of the synchronous motor and the internal phase difference angle δ in a similar manner to the way in the fourth embodiment.

The three-phase MT converter 19 determines the torque current value $I_T$ and magnetic flux current value $I_M$ of the synchronous motor on the basis of the three-phase armature current sensed values Iu, Iv, and Iw of the synchronous motor, the internal phase difference angle δ of the synchronous motor, and the magnetic pole position sensed value θr, and outputs the results.

On the basis of the deviation of the torque current value $I_T$ from the torque current reference value $I_T^*$, the torque current controller 20 performs proportional integral control and determines and outputs the voltage phase compensating value Δθ* of the voltage the power converter outputs.

As described above, with the synchronous motor controller according to the eighth embodiment, because the amplitude of the armature voltage is kept constant and only the phase is changed, the armature current can be controlled. This enables the synchronous motor to be controlled stably, even when the maximum output voltage of the power converter is made equal to the rated voltage of the synchronous motor.

(Ninth Embodiment)

Figure 12:
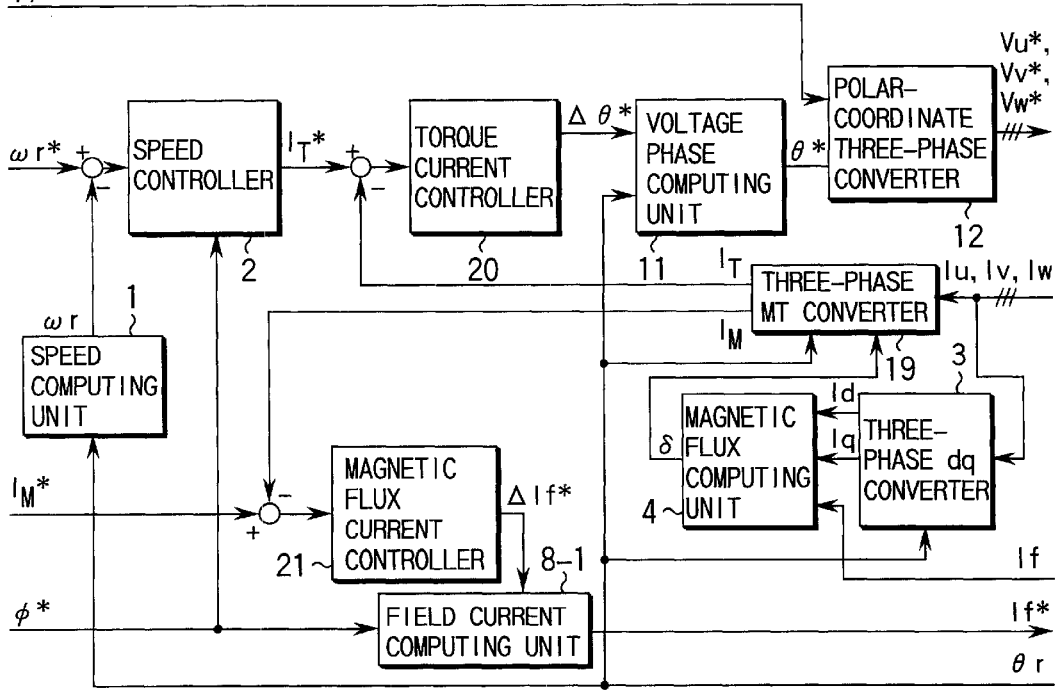
FIG. 12 is a functional block diagram of a ninth embodiment of the synchronous motor controller according to the present invention.

FIG. 12 is a functional block diagram showing an example of the configuration of a synchronous motor controller according to a ninth embodiment of the present invention. The same parts as those in FIG. 11 are indicated by the same reference symbols and an explanation of them will be omitted. Only the parts differing from those in FIG. 11 will be explained.

As shown in FIG. 12, the synchronous motor controller according to the ninth embodiment is such that a magnetic flux current controller 21 is added to the configuration of FIG. 11 and a field current computing unit 8-1 is used in place of the field current computing unit 8.

The magnetic flux current controller 21 computes the field current compensating value of the synchronous motor on the basis of the deviation of the magnetic flux current value computed by the three-phase MT converter 19 from the magnetic flux current reference value of the synchronous motor.

The field current computing unit 8-1 calculates the field current reference value of the synchronous motor on the basis of the field current compensating value computed by the magnetic flux current controller 21 and the magnetic flux reference value of the synchronous motor.

Next, the operation of the synchronous motor controller according to the ninth embodiment constructed as described above will be explained.

Explanation of the operation of the same parts as those in FIG. 11 will be omitted. The operation of only the parts differing from those in FIG. 11 will be explained.

In FIG. 12, the magnetic flux current controller 21 performs proportional integral control on the basis of the deviation of the magnetic flux current value $I_M$ from the magnetic flux current reference value $I_M^*$ of the synchronous motor and determines and outputs the field current compensating value ΔIf* of the synchronous motor.

The field current computing unit 8-1 determines the field current reference value If* of the synchronous motor on the basis of the field current compensating value ΔIf* and the magnetic flux reference value φ* of the synchronous motor and outputs the result.

As described above, the synchronous motor controller of the ninth embodiment not only produces the same effect as that of the eighth embodiment but also enables the magnetic flux current of the synchronous motor to be controlled to a given value. When the magnetic flux current is reduced particularly to zero, this makes it possible to keep the power factor of the synchronous motor at 1.

(Tenth Embodiment)

Figure 13:
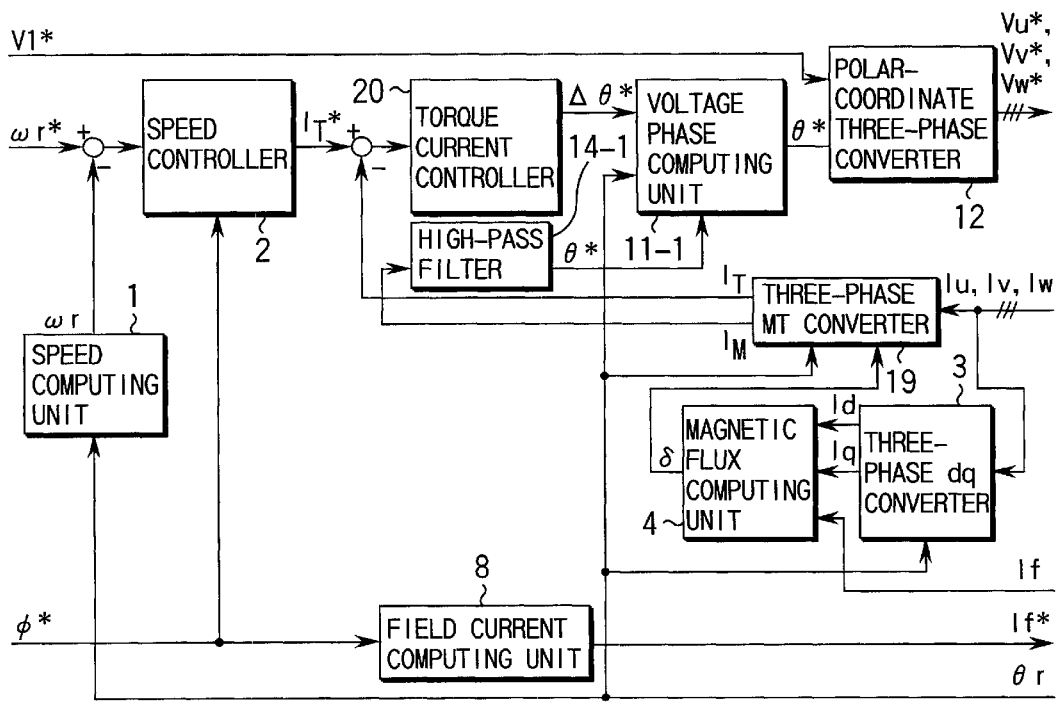
FIG. 13 is a functional block diagram of a tenth embodiment of the synchronous motor controller according to the present invention.

FIG. 13 is a functional block diagram showing an example of the configuration of a synchronous motor controller according to a tenth embodiment of the present invention. The same parts as those in FIG. 11 are indicated by the same reference symbols and an explanation of them will be omitted. Only the parts differing from those in FIG. 11 will be explained.

As shown in FIG. 13, the synchronous motor controller according to the tenth embodiment is such that a high-pass filter 14-1 is added to the configuration of FIG. 11 and a voltage phase computing unit 11-1 is used in place of the voltage phase computing unit 11.

The high-pass filter 14-1 computes the voltage phase oscillation compensating value on the basis of the magnetic flux current value computed by the three-phase MT converter 19.

On the basis of the voltage phase oscillation compensating value computed by the high-pass filter 14-1, the voltage phase compensating value computed by the torque current controller 20, and the magnetic pole position sensed value of the synchronous motor, the voltage phase computing unit 11-1 calculates the voltage phase reference value of the voltage the power converter outputs.

Next, the operation of the synchronous motor controller according to the tenth embodiment constructed as described above will be explained.

Explanation of the operation of the same parts as those in FIG. 11 will be omitted. The operation of only the parts differing from those in FIG. 11 will be explained.

In FIG. 13, the high-pass filter 14-1 senses the oscillating component included in the magnetic flux current by removing the direct-current component from the magnetic flux current value $I_M$ of the synchronous motor, determines the voltage phase oscillation compensating value θd* of the voltage the power converter outputs by multiplying the sensed oscillating component by a suitable coefficient, and outputs the determined compensating value.

On the basis of the voltage phase oscillation compensating value θd*, the voltage phase compensating value Δθ*, and the magnetic pole position sensed value θr of the synchronous motor, the voltage phase computing unit 11-1 calculates the voltage phase reference value θ* of the voltage the power converter outputs in the same manner as in the third embodiment.

As described above, the synchronous motor controller of the tenth embodiment not only produces the same effect as that of the eighth embodiment but also suppresses the oscillation of the torque current taking place as a result of the oscillation of the voltage phase, when the torque current of the synchronous motor is controlled by the change of the voltage phase the power converter outputs.

(Eleventh Embodiment)

Figure 14:
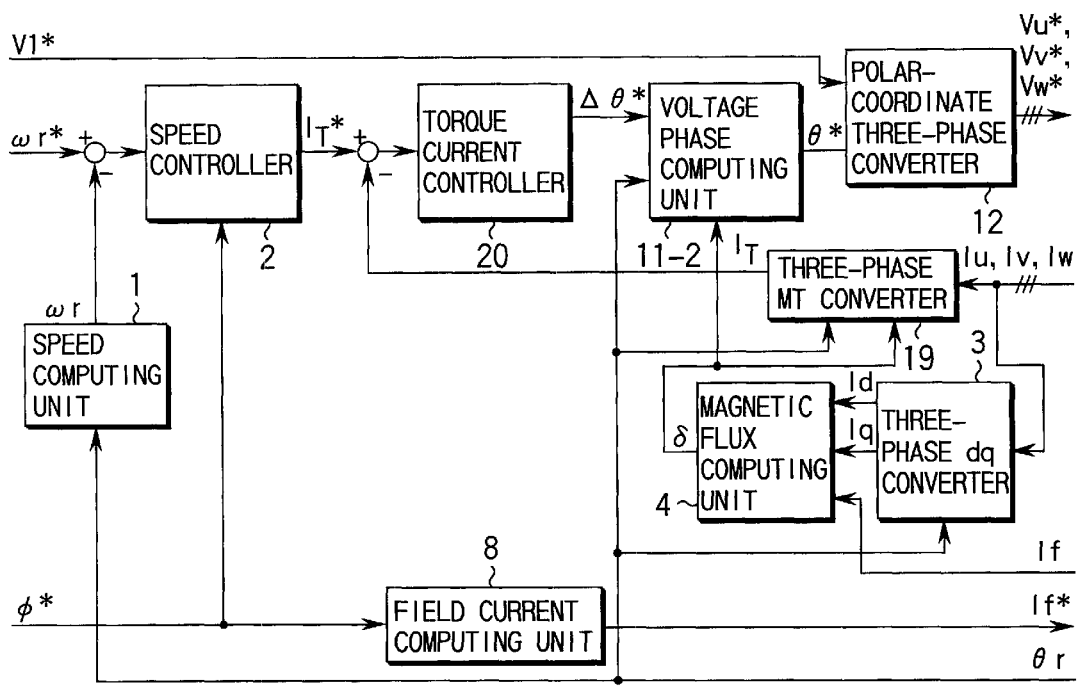
FIG. 14 is a functional block diagram of an eleventh embodiment of the synchronous motor controller according to the present invention.

FIG. 14 is a functional block diagram showing an example of the configuration of a synchronous motor controller according to an eleventh embodiment of the present invention. The same parts as those in FIG. 11 are indicated by the same reference symbols and an explanation of them will be omitted. Only the parts differing from those in FIG. 11 will be explained.

As shown in FIG. 14, the synchronous motor controller according to the eleventh embodiment is such that the voltage phase computing unit 11 is replaced with a voltage phase computing unit 11-2 in the configuration of FIG. 11.

The voltage phase computing unit 11-2 calculates the voltage phase reference value of the voltage the power converter outputs, on the basis of the internal phase difference angle calculated by the magnetic flux computing unit 4, the voltage phase compensating value calculated by the torque current controller 20, and the magnetic pole position sensed value of the synchronous motor.

Next, the operation of the synchronous motor controller according to the eleventh embodiment constructed as described above will be explained.

Explanation of the operation of the same parts as those in FIG. 11 will be omitted. The operation of only the parts differing from those in FIG. 11 will be explained.

In FIG. 14, on the basis of the internal phase difference angle δ, the voltage phase compensating value Δθ*, and the magnetic pole position sensed value θr of the synchronous motor, the voltage phase computing unit 11-2 calculates the voltage phase reference value θ* of the voltage outputted by the power converter and outputs the result.

As described above, the synchronous motor controller of the eleventh embodiment not only produces the same effect as that of the eighth embodiment but also improves the response speed of torque current control, because the voltage phase reference value is compensated for in a feedforward manner, when the torque current of the synchronous motor is controlled by the change of the voltage phase the power converter outputs.

(Twelfth Embodiment)

Figure 15:
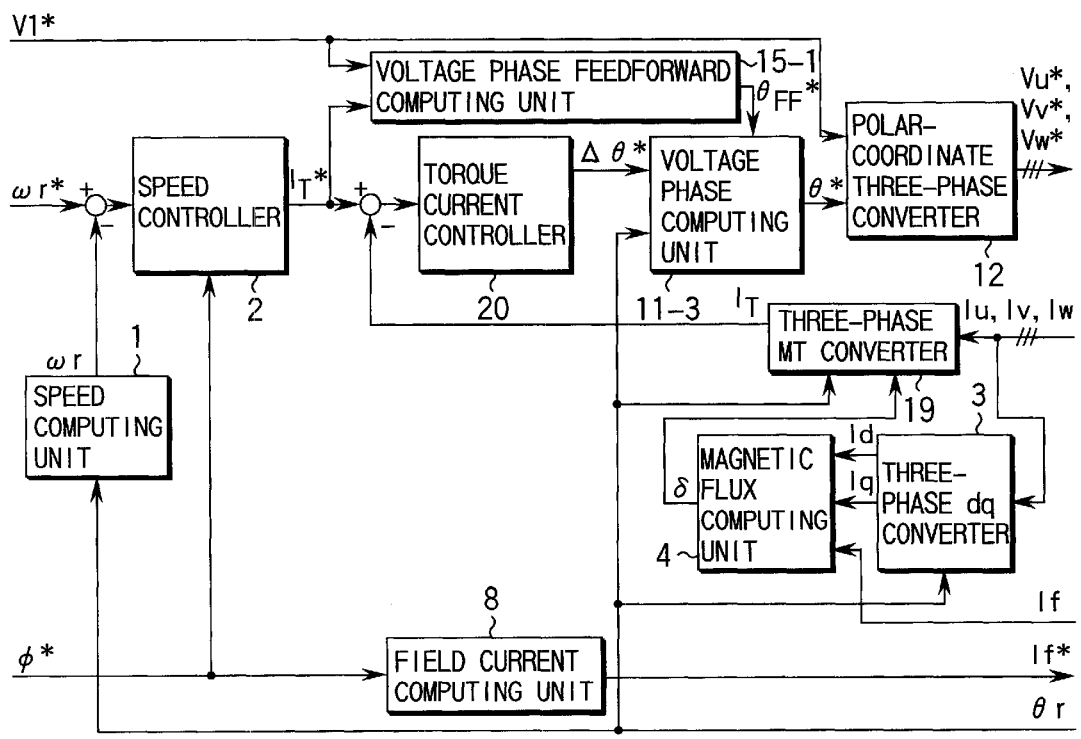
FIG. 15 is a functional block diagram of a twelfth embodiment of the synchronous motor controller according to the present invention.

FIG. 15 is a functional block diagram showing an example of the configuration of a synchronous motor controller according to a twelfth embodiment of the present invention. The same parts as those in FIG. 11 are indicated by the same reference symbols and an explanation of them will be omitted. Only the parts differing from those in FIG. 11 will be explained.

As shown in FIG. 15, the synchronous motor controller according to the twelfth embodiment is such that a voltage phase feedforward computing unit 15-1 is added to the configuration of FIG. 11 and a voltage phase computing unit 11-3 is used in place of the voltage phase computing unit 11.

On the basis of the torque current reference value computed by the speed controller 2 and the voltage amplitude reference value of the voltage outputted by the power converter, the voltage phase feedforward computing unit 15-1 calculates the voltage phase feedforward value of the voltage the power converter outputs, using the constant of the synchronous motor.

The voltage phase computing unit 11-3 calculates the voltage phase reference value of the voltage outputted by the power converter, on the basis of the voltage phase feedforward value calculated by the voltage phase feedforward computing unit 15-1, the voltage phase compensating value computed by the torque current controller 20, and the magnetic pole position sensed value of the synchronous motor.

Next, the operation of the synchronous motor controller according to the twelfth embodiment constructed as described above will be explained.

Explanation of the operation of the same parts as those in FIG. 11 will be omitted. The operation of only the parts differing from those in FIG. 11 will be explained.

In FIG. 15, on the basis of the torque current reference value $I_T^*$ of the synchronous motor and the voltage amplitude reference value $V_1^*$ outputted by the power converter, the voltage phase feedforward computing unit 15 calculates the voltage phase feedforward value $\theta_{FF}^*$, using the following equation, and outputs the result:

$$\theta_{FF}^* = \sin^{-1}(X_L \cdot I_T^* / V_1^*)$$

The voltage phase computing unit 11-3 calculates the voltage phase reference value θ* of the voltage the power converter outputs, on the basis of the voltage phase feedforward value θFF*, the voltage phase compensating value Δθ*, and the magnetic pole position sensed value θr of the synchronous motor.

As described above, the synchronous motor controller of the twelfth embodiment not only produces the same effect as that of the eighth embodiment but also improves the response speed of torque current control, because the voltage phase reference value is compensated for in a feedforward manner, when the torque current of the synchronous motor is controlled by the change of the voltage phase the power converter outputs.

(Thirteenth Embodiment)

Figure 16:
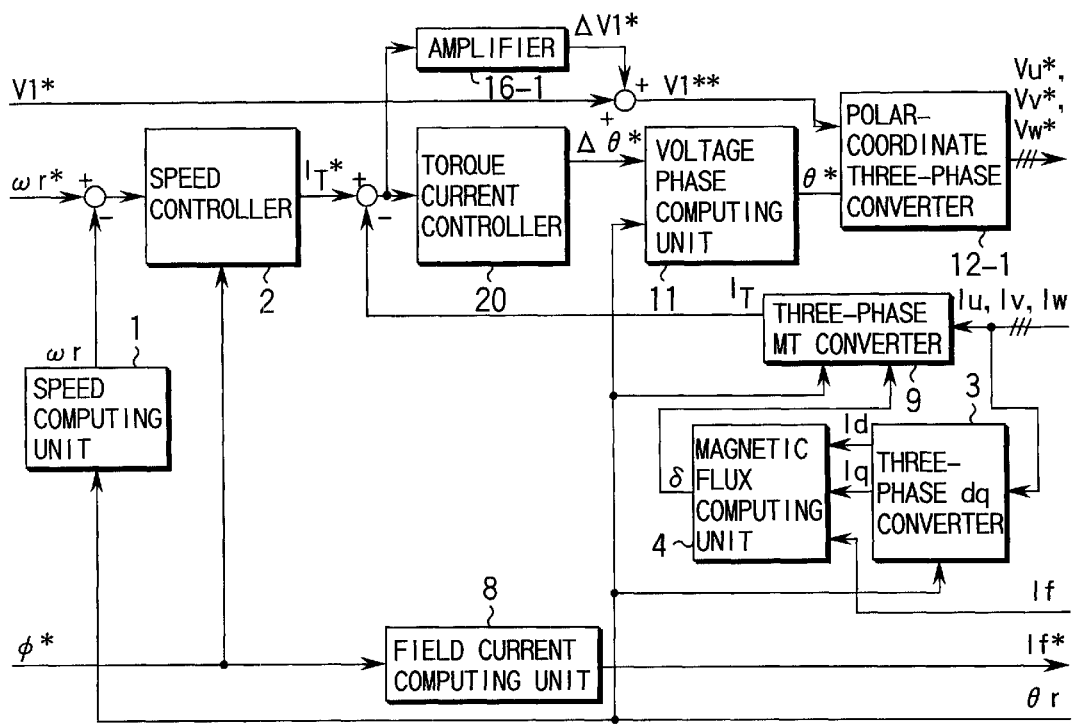
FIG. 16 is a functional block diagram of a thirteenth embodiment of the synchronous motor controller according to the present invention.

FIG. 16 is a functional block diagram showing an example of the configuration of a synchronous motor controller according to a thirteenth embodiment of the present invention. The same parts as those in FIG. 11 are indicated by the same reference symbols and an explanation of them will be omitted. Only the parts differing from those in FIG. 11 will be explained.

As shown in FIG. 16, the synchronous motor controller according to the thirteenth embodiment is such that an amplifier 16-1 and an adder 17 are added to the configuration of FIG. 11 and a polar-coordinate three-phase converter 12-1 is used in place of the polar-coordinate three-phase converter 12.

The amplifier 16-1 computes the voltage amplitude compensating value of the voltage the power converter outputs, on the basis of the deviation of the torque current value computed by the three-phase MT converter 19 from the torque current reference value computed by the speed controller 2.

The adder 17 adds the voltage amplitude compensating value computed by the amplifier 16-1 to the voltage amplitude reference value of the voltage the power converter outputs to correct the voltage amplitude reference value outputted from the power converter and outputs the corrected value.

On the basis of the corrected voltage amplitude reference value outputted by the adder 17 and the voltage phase reference value calculated by the voltage phase computing unit 11, the polar-coordinate three-phase converter 12-1 calculates the three-phase voltage reference value the power converter outputs.

Next, the operation of the synchronous motor controller according to the thirteenth embodiment constructed as described above will be explained.

Explanation of the operation of the same parts as those in FIG. 11 will be omitted. The operation of only the parts differing from those in FIG. 11 will be explained.

In FIG. 16, the amplifier 16-1 amplifies the deviation of the torque current value IT from the torque current reference value $I_T^*$ of the synchronous motor using a suitable coefficient, thereby determining the voltage oscillation compensating value $\Delta V_1^*$ of the voltage the power converter outputs, using the following equation:

$$\Delta V_1^* = K(I_T^* \cdot I_T)$$

The adder 17 adds the voltage amplitude compensating value $\Delta V_1^*$ to the voltage amplitude reference value $V_1^*$ and outputs a new voltage amplitude reference value $V_1^{**}$.

On the basis of the voltage amplitude reference value $V_1^{**}$ and voltage phase reference value θ*, the polar-coordinate three-phase converter 12-1 calculates the three-phase voltage reference values Vu*, Vv*, and Vw* of the voltage the power converter outputs in the same manner as in the sixth embodiment.

As described above, the synchronous motor controller of the thirteenth embodiment not only produces the same effect as that of the eighth embodiment but also improves the response speed of torque current control, because the voltage amplitude is compensated for, when the torque current of the synchronous motor is controlled by the change of the voltage phase the power converter outputs.

(Fourteenth Embodiment)

Figure 17:
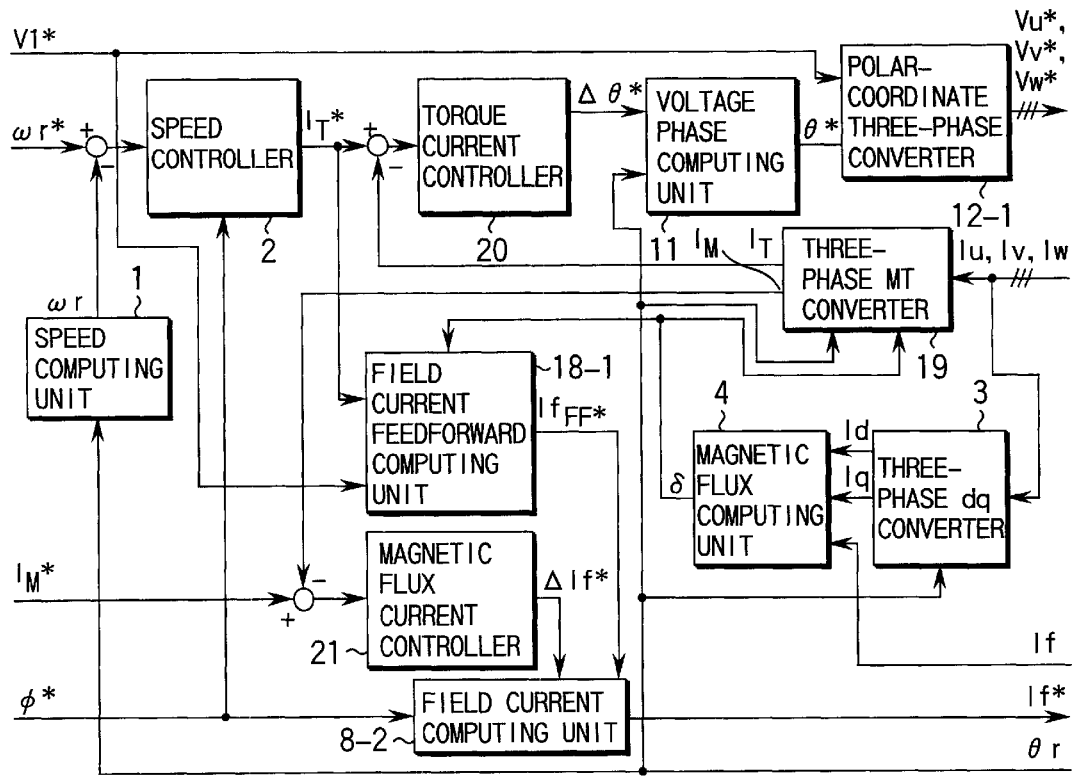
FIG. 17 is a functional block diagram of a fourteenth embodiment of the synchronous motor controller according to the present invention.

FIG. 17 is a functional block diagram showing an example of the configuration of a synchronous motor controller according to a fourteenth embodiment of the present invention. The same parts as those in FIG. 12 are indicated by the same reference symbols and an explanation of them will be omitted. Only the parts differing from those in FIG. 12 will be explained.

As shown in FIG. 17, the synchronous motor controller according to the fourteenth embodiment is such that a field current feedforward computing unit 18-1 is added to the configuration of FIG. 12 and a field current computing unit 8-2 is used in place of the field current computing unit 8-1.

The field current feedforward computing unit 18-1 calculates the field current feedforward value of the synchronous motor using the constant of the synchronous motor, on the basis of the internal phase difference angle calculated by the magnetic flux computing unit 4, the torque current reference value calculated by the speed controller 2, and the voltage amplitude reference value of the voltage the power converter outputs.

The field current computing unit 8-2 calculates the field current reference value of the synchronous motor on the basis of the field current feedforward value calculated by the field current feedforward computing unit 18-1, the field current compensating value computed by the magnetic flux current controller 21, and the magnetic flux reference value of the synchronous motor.

Next, the operation of the synchronous motor controller according to the fourteenth embodiment constructed as described above will be explained.

Explanation of the operation of the same parts as those in FIG. 12 will be omitted. The operation of only the parts differing from those in FIG. 12 will be explained.

In FIG. 17, on the basis of the voltage amplitude reference value $V_1^*$ outputted from the power converter, the torque current reference value $I_T^*$ of the synchronous motor, and the internal phase difference angle δ, the field current feedforward computing unit 18-1 calculates the field current feedforward value $If_{FF}^*$ of the synchronous motor using the following equation, and outputs the result:

$$If_{FF^*} = \frac{\left(\sqrt{\left(\sqrt{(v_{1^*})^2 - (x_L I_{T^*})^2} - R_a I_{T^*}\right)^2 - (x_{aq} I_{T^*} \cos\delta)^2} + x_{ad} I_{T^*} \sin\delta\right)}{x_{ad}}$$

On the basis of the calculated field current feedforward value $If_{FF}^*$, field current compensating value $\Delta If^*$, and magnetic flux reference value $\phi^*$ of the synchronous motor, the field current computing unit 8-2 calculates the field current reference value $If^*$ of the synchronous motor.

As described above, the synchronous motor controller of the fourteenth embodiment not only produces the same effect as that of the ninth embodiment but also improves the response speed of magnetic flux current control, because the field current reference value is compensated for in a feedforward manner, when the magnetic flux current of the synchronous motor is controlled by adjusting the field current.

INDUSTRIAL APPLICABILITY

As described above, with the synchronous motor controller of the present invention, because the amplitude of the output voltage of the power converter is kept constant and the phase is allowed to change, current control of the synchronous motor is performed stably. This enables the synchronous motor to be controlled stably, even when the maximum output voltage of the power converter is made equal to the rated voltage of the synchronous motor.

What is claimed is:

1. A synchronous motor controller for driving a synchronous motor at variable speed with a power converter, comprising:

speed control means for calculating an active current reference value based on a deviation of a speed sensed value of said synchronous motor from a speed reference value of said synchronous motor;

three-phase PQ conversion means for calculating an active current value and a reactive current value based on a three-phase current sensed value, or an armature current of said synchronous motor, and a voltage phase reference value;

active current control means for calculating a voltage phase compensating value based on a deviation of the active current value calculated by said three-phase PQ conversion means and the active current reference value calculated by said speed control means;

voltage phase computing means for calculating the voltage phase reference value based on the voltage phase compensating value calculated by said active power control means and a magnetic pole position sensed value of said synchronous motor; and polar-coordinate three-phase conversion means for calculating a three-phase voltage reference value based on the voltage phase reference value calculated by said voltage phase computing means and a voltage amplitude reference value.

2. The synchronous motor controller according to claim 1, further comprising:

reactive current control means for calculating a field current compensating value of said synchronous motor based on a deviation of the reactive current value calculated by said three-phase PQ conversion means from a reactive current reference value; and field current computing means for calculating a field current reference value of said synchronous motor based on the field current compensating value calculated by said reactive current control means and a magnetic flux reference value of said synchronous motor.

3. The synchronous motor controller according to claim 1, further comprising:

a high-pass filter for calculating a voltage phase oscillation compensating value based on the reactive current value calculated by said three-phase PQ conversion means, wherein the voltage phase computing means calculates the voltage phase reference value based on the voltage phase oscillation compensating value calculated by said high-pass filter, the voltage phase compensating value calculated by said active current control means, and the magnetic pole position sensed value of said synchronous motor.

4. The synchronous motor controller according to claim 1, further comprising:

three-phase dq conversion means for calculating a d-axis current value, or an armature current in a direction of magnetic pole of said synchronous motor, and a q-axis current value, or an armature current in a direction perpendicular to the magnetic pole based on the three-phase current sensed value, or the armature current of said synchronous motor, and the magnetic pole position sensed value of said synchronous motor; and magnetic flux computing means for calculating an internal phase difference angle of said synchronous motor, using a constant of said synchronous motor, based on the d-axis current value and q-axis current value calculated by said three-phase dq conversion means and a field current sensed value of said synchronous motor, wherein the voltage phase computing means calculates the voltage phase reference value based on the internal phase difference angle calculated by said magnetic flux computing means, the voltage phase compensating value calculated by said active current control means, and the magnetic pole position sensed value of the synchronous motor.

5. The synchronous motor controller according to claim 4, further comprising:

voltage phase feedforward computing means for calculating a voltage phase feedforward value using the constant of said synchronous motor based on the active current reference value calculated by said speed control means and the voltage amplitude reference value, wherein the voltage phase computing means calculates the voltage phase reference value based on the voltage phase feedforward value calculated by said voltage phase feedforward computing means, the voltage phase compensating value calculated by said active current control means, and the magnetic pole position sensed value of said synchronous motor.

6. The synchronous motor controller according to claim 1, further comprising:

amplifying means for calculating a voltage amplitude compensating value based on a deviation of the active current value calculated by said three-phase PQ conversion means from the active current reference value calculated by said speed control means;

add means for adding the voltage amplitude compensating value calculated by said amplifying means to the voltage amplitude reference value to correct the voltage amplitude reference value and for outputting the corrected voltage amplitude reference value; and polar-coordinate three-phase conversion means for calculating the three-phase voltage reference value based on the corrected voltage amplitude reference value outputted from said add means and the voltage phase reference value calculated by said voltage phase computing means.

7. The synchronous motor controller according to claim 2, further comprising:

three-phase dq conversion means for calculating a d-axis current value, or an armature current in a direction of magnetic pole of said synchronous motor, and a q-axis current value, or an armature current in a direction perpendicular to the magnetic pole based on the three-phase current sensed value, or the armature current of said synchronous motor, and the magnetic pole position sensed value of said synchronous motor;

magnetic flux computing means for calculating an internal phase difference angle of said synchronous motor, using a constant of said synchronous motor, based on the d-axis current value and q-axis current value calculated by said three-phase dq conversion means and the field current sensed value of said synchronous motor;

voltage phase feedforward computing means for calculating a voltage phase feedforward value of the voltage said power converter outputs, using the constant of said synchronous motor, based on the active current reference value calculated by said speed control means and the voltage amplitude reference value; and field current feedforward computing means for calculating a field current feedforward value of said synchronous motor, using the constant of said synchronous motor, based on the internal phase difference angle calculated by said magnetic flux computing means, the voltage phase feedforward value calculated by said voltage phase feedforward computing means, the active current reference value calculated by said speed control means, and the voltage amplitude reference value, wherein the field current computing means calculates the field current reference value of said synchronous motor based on the field current feedforward value calculated by said field current feedforward computing means, the field current compensating value calculated by said reactive current control means, and the magnetic flux reference value of said synchronous motor.

8. A synchronous motor controller for driving a synchronous motor at variable speed with a power converter, comprising:

speed control means for calculating a torque current reference value of said synchronous motor based on a deviation of a speed sensed value of said synchronous motor from a speed reference value of said synchronous motor;

three-phase dq conversion means for calculating a d-axis current value, or an armature current in a direction of magnetic pole of said synchronous motor, and a q-axis current value, or an armature current in a direction perpendicular to the magnetic pole based on the three-phase current sensed value, or an armature current of said synchronous motor, and a magnetic pole position sensed value of said synchronous motor;

magnetic flux computing means for calculating an internal phase difference angle of said synchronous motor, using a constant of said synchronous motor, based on the d-axis current value and q-axis current value calculated by said three-phase dq conversion means and a field current sensed value of said synchronous motor;

three-phase MT conversion means for calculating a magnetic flux current value and torque current value of said synchronous motor based on the internal phase difference angle calculated by said magnetic flux computing means, the magnetic pole position sensed value of said synchronous motor, and a three-phase current sensed value, or the armature current of said synchronous motor;

torque current control means for calculating a voltage phase compensating value based on a deviation of the torque current value calculated by said three-phase MT conversion means from the torque current reference value calculated by said speed control means;

voltage phase computing means for calculating a voltage phase reference value based on the voltage phase compensating value calculated by said torque current control means and the magnetic pole position sensed value of said synchronous motor; and polar-coordinate three-phase conversion means for calculating a three-phase voltage reference value based on the voltage phase reference value calculated by said voltage phase computing means and a voltage amplitude reference value.

9. The synchronous motor controller according to claim 8, further comprising:

magnetic flux current control means for calculating a field current compensating value of said synchronous motor based on a deviation of the magnetic flux current value calculated by said three-phase MT conversion means from a magnetic flux current reference value of said synchronous motor; and field current computing means for calculating a field current reference value of said synchronous motor based on the field current compensating value calculated by said magnetic flux current control means and a magnetic flux reference value of said synchronous motor.

10. The synchronous motor controller according to claim 8, further comprising:

a high-pass filter for calculating a voltage phase oscillation compensating value based on the magnetic flux current value calculated by said three-phase MT conversion means, wherein the voltage phase computing means calculates the voltage phase reference value based on the voltage phase oscillation compensating value calculated by said high-pass filter, the voltage phase compensating value calculated by said torque current control means, and the magnetic pole position sensed value of said synchronous motor.

11. The synchronous motor controller according to claim 8, wherein the voltage phase computing means calculates the voltage phase reference value based on the internal phase difference angle calculated by said magnetic flux computing means, the voltage phase compensating value calculated by said torque current control means, and the magnetic pole position sensed value of said synchronous motor.

12. The synchronous motor controller according to claim 8, further comprising:

voltage phase feedforward computing means for calculating a voltage phase feedforward value using the constant of said synchronous motor based on the torque current reference value calculated by said speed control means and the voltage amplitude reference value, wherein the voltage phase computing means calculates the voltage phase reference value based on the voltage phase feedforward value calculated by said voltage phase feedforward computing means, the voltage phase compensating value calculated by said torque current control means, and the magnetic pole position sensed value of said synchronous motor.

13. The synchronous motor controller according to claim 8, further comprising:

amplifying means for calculating a voltage amplitude compensating value based on a deviation of the torque current value calculated by said three-phase MT conversion means from the torque current reference value calculated by said speed control means;

add means for adding the voltage amplitude compensating value calculated by said amplifying means to the voltage amplitude reference value to correct the voltage amplitude reference value, and for outputting a corrected voltage amplitude reference value; and polar-coordinate three-phase conversion means for calculating the three-phase voltage reference value based on the corrected voltage amplitude reference value outputted from said add means and the voltage phase reference value calculated by said voltage phase computing means.

14. The synchronous motor controller according to claim 9, further comprising:

field current feedforward computing means for calculating a field current feedforward value of said synchronous motor using the constant of said synchronous motor based on the internal phase difference angle calculated by said magnetic flux computing means, the torque current reference value calculated by said speed control means, and the voltage amplitude reference value, wherein the field current computing means calculates the field current reference value of said synchronous motor based on the field current feedforward value calculated by said field current feedforward computing means, the field current compensating value calculated by said magnetic flux current control means, and the magnetic flux reference value of said synchronous motor.

15. A synchronous motor controller configured to drive a synchronous motor at variable speed with a power converter, comprising:

a speed control unit configured to calculate an active current reference value based on a deviation of a speed sensed value of said synchronous motor from a speed reference value of said synchronous motor;

a three-phase PQ conversion unit configured to calculate an active current value and a reactive current value based on a three-phase current sensed value, or an armature current of said synchronous motor, and a voltage phase reference value;

an active current control unit configured to calculate a voltage phase compensating value based on a deviation of the active current value calculated by said three-phase PQ conversion unit and the active current reference value calculated by said speed control unit;

a voltage phase computing unit configured to calculate the voltage phase reference value based on the voltage phase compensating value calculated by said active power control unit and a magnetic pole position sensed value of said synchronous motor; and a polar-coordinate three-phase conversion unit configured to calculate a three-phase voltage reference value based on the voltage phase reference value calculated by said voltage phase computing unit and a voltage amplitude reference value.

16. The synchronous motor controller according to claim 15, further comprising:

a reactive current control unit configured to calculate a field current compensating value of said synchronous motor based on a deviation of the reactive current value calculated by said three-phase PQ conversion unit from a reactive current reference value; and a field current computing unit configured to calculate a field current reference value of said synchronous motor based on the field current compensating value calculated by said reactive current control unit and a magnetic flux reference value of said synchronous motor.

17. The synchronous motor controller according to claim 15, further comprising:

a high-pass filter configured to calculate a voltage phase oscillation compensating value based on the reactive current value calculated by said three-phase PQ conversion unit, wherein the voltage phase computing unit calculates the voltage phase reference value based on the voltage phase oscillation compensating value calculated by said high-pass filter, the voltage phase compensating value calculated by said active current control unit, and the magnetic pole position sensed value of said synchronous motor.

18. The synchronous motor controller according to claim 15, further comprising:

a three-phase dq conversion unit configured to calculate a d-axis current value, or an armature current in a direction of magnetic pole of said synchronous motor, and a q-axis current value, or an armature current in a direction perpendicular to the magnetic pole based on the three-phase current sensed value, or the armature current of said synchronous motor, and the magnetic pole position sensed value of said synchronous motor; and a magnetic flux computing unit configured to calculate an internal phase difference angle of said synchronous motor using a constant of said synchronous motor based on the d-axis current value and q-axis current value calculated by said three-phase dq conversion unit and a field current sensed value of said synchronous motor, wherein the voltage phase computing unit calculates the voltage phase reference value based on the internal phase difference angle calculated by said magnetic flux computing unit, the voltage phase compensating value calculated by said active current control unit, and the magnetic pole position sensed value of the synchronous motor.

19. The synchronous motor controller according to claim 18, further comprising:

a voltage phase feedforward computing unit configured to calculate a voltage phase feedforward value using the constant of said synchronous motor based on the active current reference value calculated by said speed control unit and the voltage amplitude reference value, wherein the voltage phase computing unit calculates the voltage phase reference value based on the voltage phase feedforward value calculated by said voltage phase feedforward computing unit, the voltage phase compensating value calculated by said active current control unit, and the magnetic pole position sensed value of said synchronous motor.

20. The synchronous motor controller according to claim 15, further comprising:

an amplifying unit configured to calculate a voltage amplitude compensating value based on a deviation of the active current value calculated by said three-phase PQ conversion unit from the active current reference value calculated by said speed control unit;

an add unit configured to add the voltage amplitude compensating value calculated by said amplifying unit to the voltage amplitude reference value to correct the voltage amplitude reference value and for outputting the corrected voltage amplitude reference value; and a polar-coordinate three-phase conversion unit configured to calculate the three-phase voltage reference value based on the corrected voltage amplitude reference value outputted from said add unit and the voltage phase reference value calculated by said voltage phase computing unit.

21. The synchronous motor controller according to claim 16, further comprising:

a three-phase dq conversion unit configured to calculate a d-axis current value, or an armature current in a direction of magnetic pole of said synchronous motor, and a q-axis current value, or an armature current in a direction perpendicular to the magnetic pole based on the three-phase current sensed value, or the armature current of said synchronous motor, and the magnetic pole position sensed value of said synchronous motor;

a magnetic flux computing unit configured to calculate an internal phase difference angle of said synchronous motor, using a constant of said synchronous motor, based on the d-axis current value and q-axis current value calculated by said three-phase dq conversion unit and the field current sensed value of said synchronous motor;

a voltage phase feedforward computing unit configured to calculate a voltage phase feedforward value using the constant of said synchronous motor, based on the active current reference value calculated by said speed control unit and the voltage amplitude reference value said power converter outputs; and a field current feedforward computing unit configured to calculate a field current feedforward value of said synchronous motor, using the constant of said synchronous motor, based on the internal phase difference angle calculated by said magnetic flux computing unit, the voltage phase feedforward value calculated by said voltage phase feedforward computing unit, the active current reference value calculated by said speed control unit, and the voltage amplitude reference value, wherein the field current computing unit calculates the field current reference value of said synchronous motor based on the field current feedforward value calculated by said field current feedforward computing unit, the field current compensating value calculated by said reactive current control unit, and the magnetic flux reference value of said synchronous motor.

22. A synchronous motor controller for driving a synchronous motor at variable speed with a power converter, comprising:

a speed control unit configured to calculate a torque current reference value of said synchronous motor based on a deviation of a speed sensed value of said synchronous motor from a speed reference value of said synchronous motor;

a three-phase dq conversion unit configured to calculate a d-axis current value, or an armature current in a direction of magnetic pole of said synchronous motor, and a q-axis current value, or an armature current in a direction perpendicular to the magnetic pole, based on the three-phase current sensed value, or an armature current of said synchronous motor, and a magnetic pole position sensed value of said synchronous motor;

a magnetic flux computing unit configured to calculate an internal phase difference angle of said synchronous motor using a constant of said synchronous motor, based on the d-axis current value and q-axis current value calculated by said three-phase dq conversion unit and a field current sensed value of said synchronous motor;

a three-phase MT conversion unit configured to calculate a magnetic flux current value and torque current value of said synchronous motor, based on the internal phase difference angle calculated by said magnetic flux computing unit, the magnetic pole position sensed value of said synchronous motor, and a three-phase current sensed value, or the armature current of said synchronous motor;

a torque current control unit configured to calculate a voltage phase compensating value based on a deviation of the torque current value calculated by said three-phase MT conversion unit from the torque current reference value calculated by said speed control unit;

a voltage phase computing unit configured to calculate a voltage phase reference value based on the voltage phase compensating value calculated by said torque current control unit and the magnetic pole position sensed value of said synchronous motor; and a polar-coordinate three-phase conversion unit configured to calculate a three-phase voltage reference value based on the voltage phase reference value calculated by said voltage phase computing unit and a voltage amplitude reference value.

23. The synchronous motor controller according to claim 22, further comprising:

a magnetic flux current control unit configured to calculate a field current compensating value of said synchronous motor based on a deviation of the magnetic flux current value calculated by said three-phase MT conversion unit from a magnetic flux current reference value of said synchronous motor; and a field current computing unit configured to calculate a field current reference value of said synchronous motor based on the field current compensating value calculated by said magnetic flux current control unit and a magnetic flux reference value of said synchronous motor.

24. The synchronous motor controller according to claim 22, further comprising:

a high-pass filter configured to calculate a voltage phase oscillation compensating value based on the magnetic flux current value calculated by said three-phase MT conversion unit, wherein the voltage phase computing unit calculates the voltage phase reference value based on the voltage phase oscillation compensating value calculated by said high-pass filter, the voltage phase compensating value calculated by said torque current control unit, and the magnetic pole position sensed value of said synchronous motor.

25. The synchronous motor controller according to claim 22, wherein the voltage phase computing unit calculates the voltage phase reference value based on the internal phase difference angle calculated by said magnetic flux computing unit, the voltage phase compensating value calculated by said torque current control unit, and the magnetic pole position sensed value of said synchronous motor.

26. The synchronous motor controller according to claim 22, further comprising:

a voltage phase feedforward computing unit configured to calculate a voltage phase feedforward value using the constant of said synchronous motor based on the torque current reference value calculated by said speed control unit and the voltage amplitude reference value, wherein the voltage phase computing unit calculates the voltage phase reference value based on the voltage phase feedforward value calculated by said voltage phase feedforward computing unit, the voltage phase compensating value calculated by said torque current control unit, and the magnetic pole position sensed value of said synchronous motor.

27. The synchronous motor controller according to claim 22, further comprising:

an amplifying unit configured to calculate a voltage amplitude compensating value based on a deviation of the torque current value calculated by said three-phase MT conversion unit from the torque current reference value calculated by said speed control unit;

an add unit configured to add the voltage amplitude compensating value calculated by said amplifying unit to the voltage amplitude reference value to correct the voltage amplitude reference value, and to output a corrected voltage amplitude reference value; and a polar-coordinate three-phase conversion unit configured to calculate the three-phase voltage reference value based on the corrected voltage amplitude reference value outputted from said add unit and the voltage phase reference value calculated by said voltage phase computing unit.

28. The synchronous motor controller according to claim 23, further comprising:

a field current feedforward computing unit configured to calculate a field current feedforward value of said synchronous motor using the constant of said synchronous motor based on the internal phase difference angle calculated by said magnetic flux computing unit, the torque current reference value calculated by said speed control unit, and the voltage amplitude reference value, wherein the field current computing unit calculates the field current reference value of said synchronous motor based on the field current feedforward value calculated by said field current feedforward computing unit, the field current compensating value calculated by said magnetic flux current control unit, and the magnetic flux reference value of said synchronous motor.

* * * * *

UNITED STATES PATENT AND TRADEMARK OFFICE
CERTIFICATE OF CORRECTION

PATENT NO.    : 6,359,415 B1
DATED         : March 19, 2002
INVENTOR(S)   : Suzuki et al.

It is certified that error appears in the above-identified patent and that said Letters Patent is hereby corrected as shown below:

<u>Title page,</u>
Item [73], the Assignee information is incorrect and should read:
-- [73]   Assignees:    Kabushiki Kaisha Toshiba, Kawasaki-shi (JP);
                        Shibafu Engineering Corporation, Fuchu-shi (JP) --

Signed and Sealed this

Fifteenth Day of October, 2002

*Attest:*

JAMES E. ROGAN
*Director of the United States Patent and Trademark Office*

*Attesting Officer*